(12) United States Patent
McMurry et al.

(10) Patent No.: US 11,388,082 B2
(45) Date of Patent: Jul. 12, 2022

(54) METHODS, SYSTEMS, AND COMPUTER READABLE MEDIA FOR DIAMETER ROUTING USING SOFTWARE DEFINED NETWORK (SDN) FUNCTIONALITY

(71) Applicant: Oracle International Corporation, Redwood Shores, CA (US)

(72) Inventors: Sam Eric McMurry, Richardson, TX (US); Ajay Padmakar Deo, Carrollton, TX (US); Apirux Bantukul, Cary, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 421 days.

(21) Appl. No.: 14/092,898

(22) Filed: Nov. 27, 2013

(65) Prior Publication Data

US 2015/0149656 A1 May 28, 2015

(51) Int. Cl.
*H04L 45/00* (2022.01)
*H04L 45/42* (2022.01)
*H04W 40/02* (2009.01)
*H04L 45/30* (2022.01)
*H04L 45/302* (2022.01)

(52) U.S. Cl.
CPC ............. *H04L 45/00* (2013.01); *H04L 45/42* (2013.01); *H04L 45/306* (2013.01); *H04W 40/02* (2013.01)

(58) Field of Classification Search
CPC ....... H04L 45/00; H04L 45/42; H04L 45/306; H04L 61/203; H04L 29/12245; H04W 40/02
See application file for complete search history.

(56) References Cited

U.S. PATENT DOCUMENTS

| 6,505,244 | B1 | 1/2003 | Natarajan et al. |
| 7,447,736 | B2 | 11/2008 | Devine et al. |
| 7,522,517 | B1 | 4/2009 | Johnson |
| 8,468,267 | B2 | 6/2013 | Yigang et al. |

(Continued)

FOREIGN PATENT DOCUMENTS

| CN | 19372623 A | 3/2007 |
| CN | 101001401 A | 7/2007 |

(Continued)

OTHER PUBLICATIONS

Wikipedia; OSI Model; 2018; https://en.wikipedia.org/wiki/OSI_model (Year: 2018).*

(Continued)

*Primary Examiner* — Tonia L Dollinger
*Assistant Examiner* — Jihad K Boustany
(74) *Attorney, Agent, or Firm* — Jenkins, Wilson, Taylor & Hunt, P.A.

(57) ABSTRACT

Methods, systems, and computer readable media for routing a Diameter message are disclosed. According to one method, the method occurs at a Diameter routing node. The method includes receiving, from a Diameter routing controller (DRC) via a software defined network (SDN) related interface, Diameter routing information, wherein the Diameter routing information is determined using application layer information. The method also includes routing a Diameter message using the Diameter routing information.

15 Claims, 7 Drawing Sheets

(56) References Cited

U.S. PATENT DOCUMENTS

| | | |
|---|---|---|
| 8,566,474 B2 | 10/2013 | Kanode et al. |
| 8,601,073 B2 | 12/2013 | Craig et al. |
| 8,612,612 B1* | 12/2013 | Dukes .................... H04L 67/14 |
| | | 370/230 |
| 8,613,073 B2 | 12/2013 | McCann et al. |
| 8,665,717 B2 | 3/2014 | Kotecha et al. |
| 8,879,431 B2 | 11/2014 | Ridel et al. |
| 8,914,526 B1 | 12/2014 | Lindquist et al. |
| 9,106,769 B2 | 8/2015 | Kanode et al. |
| 9,240,949 B2 | 1/2016 | McMurry et al. |
| 9,298,515 B2 | 3/2016 | McMurry et al. |
| 9,369,386 B2 | 6/2016 | McMurry et al. |
| 9,369,390 B2 | 6/2016 | Bantukul et al. |
| 9,391,897 B2 | 7/2016 | Sparks et al. |
| 9,398,492 B2 | 7/2016 | Deo |
| 9,450,817 B1 | 9/2016 | Bahadur et al. |
| 9,450,872 B2 | 9/2016 | Campbell et al. |
| 9,537,775 B2 | 1/2017 | McMurry et al. |
| 9,537,904 B2 | 1/2017 | Bantukul |
| 9,699,045 B2 | 7/2017 | Roach et al. |
| 9,838,483 B2 | 12/2017 | McMurry et al. |
| 9,917,729 B2 | 3/2018 | McMurry et al. |
| 2002/0004827 A1 | 1/2002 | Ciscon et al. |
| 2002/0009181 A1 | 7/2002 | Hundscheidt et al. |
| 2003/0200277 A1 | 10/2003 | Kim |
| 2004/0199632 A1 | 10/2004 | Romero et al. |
| 2005/0105464 A1 | 5/2005 | Acharya et al. |
| 2006/0069776 A1 | 3/2006 | Shim et al. |
| 2006/0090004 A1 | 4/2006 | Nikolayev et al. |
| 2006/0268835 A1 | 11/2006 | Hyotylainen et al. |
| 2007/0033531 A1 | 2/2007 | Marsh |
| 2007/0083927 A1 | 4/2007 | Swaroop |
| 2007/0121596 A1 | 5/2007 | Kurapati et al. |
| 2007/0153995 A1 | 7/2007 | Fang et al. |
| 2008/0031258 A1 | 2/2008 | Acharya et al. |
| 2008/0170497 A1 | 7/2008 | Jeong et al. |
| 2008/0198747 A1 | 8/2008 | Gilfix et al. |
| 2008/0250156 A1 | 10/2008 | Agarwal et al. |
| 2008/0253387 A1 | 10/2008 | Liang et al. |
| 2009/0083861 A1 | 3/2009 | Jones |
| 2009/0092131 A1 | 4/2009 | Hu et al. |
| 2009/0185494 A1 | 7/2009 | Li et al. |
| 2009/0232011 A1 | 9/2009 | Li et al. |
| 2009/0265467 A1 | 10/2009 | Peles |
| 2009/0327079 A1 | 12/2009 | Parker et al. |
| 2010/0030914 A1 | 2/2010 | Sparks et al. |
| 2010/0071035 A1 | 3/2010 | Budko et al. |
| 2010/0080172 A1 | 4/2010 | Jin et al. |
| 2010/0103861 A1 | 4/2010 | Ulupinar et al. |
| 2010/0125477 A1 | 5/2010 | Mousseau et al. |
| 2010/0211956 A1 | 8/2010 | Gopisetty et al. |
| 2010/0217850 A1 | 8/2010 | Ferris |
| 2010/0220622 A1 | 9/2010 | Wei |
| 2010/0299451 A1 | 11/2010 | Yigang et al. |
| 2011/0016467 A1 | 1/2011 | Kane |
| 2011/0023029 A1 | 1/2011 | Diab et al. |
| 2011/0040845 A1 | 2/2011 | Cai et al. |
| 2011/0061061 A1 | 3/2011 | Chen et al. |
| 2011/0090900 A1 | 4/2011 | Jackson et al. |
| 2011/0116382 A1 | 5/2011 | McCann et al. |
| 2011/0131332 A1 | 6/2011 | Bouazizi |
| 2011/0145407 A1 | 6/2011 | Pascual Avila et al. |
| 2011/0171958 A1 | 7/2011 | Hua et al. |
| 2011/0200053 A1* | 8/2011 | Kanode ............... H04L 63/0892 |
| | | 370/401 |
| 2011/0202676 A1 | 8/2011 | Craig et al. |
| 2011/0219229 A1 | 9/2011 | Cholas et al. |
| 2011/0231899 A1 | 9/2011 | Pulier et al. |
| 2011/0299395 A1 | 12/2011 | Mariblanca Nieves |
| 2011/0314178 A1* | 12/2011 | Kanode ............... H04L 63/0892 |
| | | 709/238 |
| 2012/0044867 A1 | 2/2012 | Faccin et al. |
| 2012/0057602 A1* | 3/2012 | Tanimoto ............ H04L 41/0893 |
| | | 370/401 |
| 2012/0087368 A1 | 4/2012 | Kunarathnam et al. |
| 2012/0123870 A1 | 5/2012 | Denman et al. |
| 2012/0131165 A1 | 5/2012 | Baniel et al. |
| 2012/0140665 A1 | 6/2012 | Li et al. |
| 2012/0155389 A1 | 6/2012 | McNamee et al. |
| 2012/0158994 A1 | 6/2012 | McNamee et al. |
| 2012/0173871 A1 | 7/2012 | Ashok et al. |
| 2012/0203781 A1 | 8/2012 | Wakefield |
| 2012/0221445 A1 | 8/2012 | Sharma |
| 2012/0221693 A1 | 8/2012 | Cutler et al. |
| 2012/0224524 A1* | 9/2012 | Marsico ............... H04L 67/2804 |
| | | 370/328 |
| 2012/0239771 A1 | 9/2012 | Rasanen |
| 2012/0254567 A1 | 10/2012 | Umbehocker |
| 2012/0281540 A1 | 11/2012 | Khan et al. |
| 2012/0300615 A1 | 11/2012 | Kempf et al. |
| 2012/0303796 A1 | 11/2012 | Mo et al. |
| 2012/0303835 A1 | 11/2012 | Kempf et al. |
| 2012/0307631 A1 | 12/2012 | Yang et al. |
| 2013/0003745 A1 | 1/2013 | Nishimura |
| 2013/0019277 A1 | 1/2013 | Chang et al. |
| 2013/0039176 A1 | 2/2013 | Kanode et al. |
| 2013/0044645 A1 | 2/2013 | Castro Castro |
| 2013/0064093 A1 | 3/2013 | Ridel et al. |
| 2013/0086279 A1 | 4/2013 | Archer et al. |
| 2013/0124712 A1 | 5/2013 | Parker |
| 2013/0163429 A1 | 6/2013 | Dunstan et al. |
| 2013/0017381 A1 | 7/2013 | Subramaniam |
| 2013/0188489 A1 | 7/2013 | Sato |
| 2013/0223219 A1 | 8/2013 | Mir et al. |
| 2013/0250770 A1 | 9/2013 | Zou et al. |
| 2013/0266007 A1* | 10/2013 | Kumbhare ............... H04L 45/56 |
| | | 370/389 |
| 2013/0275583 A1 | 10/2013 | Roach et al. |
| 2013/0279508 A1* | 10/2013 | Kano .................... H04L 45/742 |
| | | 370/392 |
| 2013/0339949 A1 | 12/2013 | Spiers et al. |
| 2013/0343295 A1 | 12/2013 | Deo |
| 2014/0026231 A1 | 1/2014 | Barak et al. |
| 2014/0032651 A1 | 1/2014 | Singh et al. |
| 2014/0059678 A1 | 2/2014 | Parker |
| 2014/0089495 A1 | 3/2014 | Akolkar et al. |
| 2014/0105039 A1 | 4/2014 | McDysan |
| 2014/0189137 A1 | 7/2014 | Castro Castro et al. |
| 2014/0192646 A1 | 7/2014 | Mir et al. |
| 2014/0204796 A1 | 7/2014 | Bantukul |
| 2014/0215076 A1 | 7/2014 | Grothues |
| 2014/0215077 A1 | 7/2014 | Soudan et al. |
| 2014/0233389 A1 | 8/2014 | Bantukul et al. |
| 2014/0237111 A1 | 8/2014 | McMurry et al. |
| 2014/0310388 A1* | 10/2014 | Djukic ................. H04L 41/0816 |
| | | 709/221 |
| 2014/0348068 A1 | 11/2014 | Morper et al. |
| 2014/0376380 A1 | 12/2014 | Campbell et al. |
| 2015/0036486 A1 | 2/2015 | McMurry et al. |
| 2015/0036504 A1 | 2/2015 | McMurry et al. |
| 2015/0036505 A1 | 2/2015 | Sparks et al. |
| 2015/0046591 A1 | 2/2015 | Zhu et al. |
| 2015/0085663 A1 | 3/2015 | McMurry et al. |
| 2015/0124622 A1 | 5/2015 | Kowali et al. |
| 2015/0131997 A1 | 5/2015 | Syed et al. |
| 2015/0142940 A1 | 5/2015 | McMurry et al. |
| 2015/0172115 A1 | 6/2015 | Nguyen et al. |
| 2015/0200838 A1 | 7/2015 | Nadeau et al. |
| 2015/0358229 A1* | 12/2015 | Steinacker ............... H04L 45/22 |
| | | 370/392 |
| 2015/0372929 A1 | 12/2015 | Rochwerger et al. |
| 2016/0197831 A1* | 7/2016 | De Foy ................ H04L 45/7453 |
| | | 370/392 |
| 2016/0197850 A1 | 7/2016 | Peng et al. |
| 2016/0205015 A1 | 7/2016 | Halligan et al. |
| 2016/0315809 A1 | 10/2016 | McMurry et al. |

FOREIGN PATENT DOCUMENTS

| | | |
|---|---|---|
| CN | 101127609 | 2/2008 |
| CN | 101938416 A | 1/2011 |
| CN | 101969391 A | 2/2011 |
| CN | 102027725 A | 4/2011 |

(56) References Cited

FOREIGN PATENT DOCUMENTS

| | | |
|---|---|---|
| CN | 102075384 A | 5/2011 |
| CN | 102195890 A | 9/2011 |
| CN | 102326430 A | 1/2012 |
| CN | 102546379 A | 7/2012 |
| CN | 103024022 A | 4/2013 |
| CN | 103036653 A | 4/2013 |
| CN | 104335539 B | 7/2017 |
| CN | ZL 201380031363.5 | 7/2018 |
| CN | ZL 201480013195.1 | 10/2018 |
| CN | ZL201480017586.0 | 3/2019 |
| CN | ZL201480017591.1 | 5/2019 |
| CN | ZL201480063468.3 | 5/2019 |
| CN | ZL201480064526.4 | 6/2019 |
| CN | ZL201580005818.5 | 1/2020 |
| EP | 2 280 520 A1 | 2/2011 |
| EP | 2 466 832 A1 | 6/2012 |
| EP | 2 784 993 A1 | 10/2014 |
| EP | 2 949 098 B1 | 10/2017 |
| EP | 2 957 071 B1 | 11/2017 |
| EP | 2 957 068 | 8/2018 |
| EP | 2 862 313 B1 | 12/2018 |
| EP | 3 072 260 B1 | 10/2019 |
| EP | 3 050 258 B1 | 4/2020 |
| EP | 3 075 108 B1 | 4/2020 |
| EP | 3 028 416 | 4/2021 |
| JP | 2003-174483 A | 6/2003 |
| JP | 2006-100873 | 4/2006 |
| JP | 2006-221649 | 8/2006 |
| JP | 2011/166737 A | 8/2011 |
| JP | 2013-098597 A | 5/2013 |
| JP | 2013-239913 A | 11/2013 |
| JP | 2015-512162 A | 4/2015 |
| JP | 6059336 | 1/2017 |
| JP | 6096325 B2 | 3/2017 |
| JP | 6163204 B2 | 7/2017 |
| JP | 6305537 B2 | 3/2018 |
| JP | 6509219 B2 | 5/2019 |
| JP | 6563936 B2 | 8/2019 |
| JP | 6883427 B | 5/2021 |
| KR | 10-2009-0029348 | 3/2009 |
| KR | 10-2009-0033968 | 4/2009 |
| KR | 10-2012-0055955 | 6/2012 |
| KR | 10-2012-0059542 | 6/2012 |
| WO | WO 2008/085372 A2 | 7/2008 |
| WO | WO 2009/070179 A1 | 6/2009 |
| WO | WO 2009/129487 A2 | 10/2009 |
| WO | WO 2010/066295 A1 | 6/2010 |
| WO | WO 2011/013805 A1 | 2/2011 |
| WO | WO 2011/063853 A1 | 6/2011 |
| WO | WO 2011/101745 A2 | 8/2011 |
| WO | WO 2011/127974 A1 | 10/2011 |
| WO | WO 2011/161575 A1 | 12/2011 |
| WO | WO 2012/003764 A1 | 1/2012 |
| WO | WO 2012/039176 A1 | 3/2012 |
| WO | WO 2012/055446 A1 | 5/2012 |
| WO | WO 2012/056816 A1 | 5/2012 |
| WO | WO 2012/063106 A1 | 5/2012 |
| WO | WO 2012/100092 A2 | 7/2012 |
| WO | WO 2012/119147 A1 | 9/2012 |
| WO | WO 2012/129167 A1 | 9/2012 |
| WO | WO 2012/130264 A1 | 10/2012 |
| WO | WO 2012/144194 A1 | 10/2012 |
| WO | WO 2012/149954 A1 | 11/2012 |
| WO | WO 2012/160465 A1 | 11/2012 |
| WO | WO 2013/041128 A1 | 3/2013 |
| WO | WO 2013/063330 A1 | 5/2013 |
| WO | WO 2013/118690 A1 | 8/2013 |
| WO | WO 2013/155535 A1 | 10/2013 |
| WO | WO 2013/188665 A1 | 12/2013 |
| WO | WO 2014/127346 A1 | 8/2014 |
| WO | WO 2014/127347 A1 | 8/2014 |
| WO | WO 2015/017422 A1 | 2/2015 |
| WO | WO 2015/077377 A1 | 5/2015 |
| WO | WO 2015/116449 A1 | 8/2015 |

OTHER PUBLICATIONS

Wikipedia; "Application Layer"; May 20, 2019; https://en.wikipedia.org/wiki/Application_layer (Year: 2019).*

Notification of Transmittal of the International Search Report and the Written Opinion of the International Searching Authority, or the Declaration for International Application No. PCT/US2014/066240 (dated May 13, 2015).

Non-Final Office Action for U.S. Appl. No. 13/956,304 (dated May 4, 2015).

Non-Final Office Action for U.S. Appl. No. 13/956,307 (dated Apr. 23, 2015).

Commonly-Assigned, co-pending U.S. Appl. No. 14/692,710 for "Methods, Systems, and Computer Readable Media for Multi-Layer Orchestration in Software Defined Networks (SDNs)," (Unpublished, filed Apr. 21, 2015).

Non-Final Office Action for U.S. Appl. No. 13/956,300 (dated Apr. 8, 2015).

Notice of Allowance and Fee(s) Due and Examiner-Initiated Interview Summary for U.S. Appl. No. 13/572,156 (dated Apr. 6, 2015).

Final Office Action for U.S. Appl. No. 13/749,655 (dated Apr. 3, 2015).

Notification of Transmittal of the International Search Report and the Written Opinion of the International Searching Authority, or the Declaration for PCT International Application No. PCT/US2015/012250 (dated Mar. 31, 2015).

Non-Final Office Action for U.S. Appl. No. 13/863,351 (dated Mar. 27, 2015).

Communication of European Publication No. and Information on the Application of Article 67(3) EPC for European Application No. 13804779.0 (dated Mar. 25, 2015).

Non-Final Office Action for U.S. Appl. No. 14/034,478 (dated Mar. 23, 2015).

Non-Final Office Action for U.S. Appl. No. 13/917,200 (dated Mar. 16, 2015).

Notification of Transmittal of the International Search Report and the Written Opinion of the International Searching Authority, or the Declaration for International Application No. PCT/US2014/066469 (dated Feb. 20, 2015).

Final Office Action for U.S. Appl. No. 13/572,156 (dated Dec. 29, 2014).

Non-Final Office Action for U.S. Appl. No. 13/572,156 (dated May 23, 2014).

"Network Function Virtualization (NFV) Management and Orchestration," ETSI, Group Specification, GS NFV-MAN 001 V0.0.11, pp. 1-74 (Oct. 18, 2013).

"Split Architecture for Large Scale Wide Area Networks," SPARC ICT-258457 Deliverable D3.3, pp. 1-129 (Dec. 1, 2011).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

Communication of European publication No. and information on the application of Article 67(3) EPC for European Application No. 13776083.1 (dated Jan. 21, 2015).

Commonly-assigned, co-pending International Application No. PCT/US15/12250 for "Methods, Systems, and Computer Readable Mediator a Cloud-Based Virtualization Orchestrator," (Unpublished, filed Jan. 21, 2015).

Commonly-assigned, co-pending International Application No. PCT/US14/66469 for "Methods, Systems, and Computer Readable Media for a Network Function Virtualization Information Concentrator," (Unpublished, filed Nov. 19, 2014).

Notification of Transmittal of the International Search Report and the Written Opinion for of the International Searching Authority, or the Declaration for International Application No. PCT/US2014/048651 (dated Nov. 17, 2014).

Notification of Transmittal of the International Search Report and the Written Opinion of the International Searching Authority, or the Declaration for International Application No. PCT/US2014/048644 (dated Oct. 17, 2014).

(56) References Cited

OTHER PUBLICATIONS

Non-Final Office Action for U.S. Appl. No. 13/749,655 (dated Sep. 3, 2014).
Commonly-assigned, co-pending International Application No. PCT/US14/48651 for "Methods, Systems, and Computer Readable Media for Diameter Load and Overload Information and Virtualization," (Unpublished, filed Jul. 29, 2014).
Commonly-assigned, co-pending International Application No. PCT/US14/48644 for "Methods, Systems, and Computer Readable Media for Mitigating Traffic Storms," (Unpublished, filed Jul. 29, 2014).
Notification of Transmittal of the International Search Report and the Written Opinion of the International Searching Authority, or the Declaration for International Application No. PCT/US2014/016853 (dated Jun. 6, 2014).
Notification of Transmittal of the International Search Report and the Written Opinion of the International Searching Authority, or the Declaration for International Application No. PCT/US2014/016860 (dated Jun. 4, 2014).
Notification of Transmittal of the International Search Report and the Written Opinion of the International Searching Authority, or the Declaration for International Application No. PCT/US2014/011551 (dated Apr. 28, 2014).
Commonly-assigned, co-pending U.S. Appl. No. 14/166,790 for "Methods, Systems, and Computer Readable Media for a Cloud-Based Virtualization Orchestrator," (Unpublished, filed Jan. 28, 2014).
Commonly-assigned, co-pending International Application No. PCT/US14/11551 for "Methods, Systems, and Computer Readable Media for Using Policy Knowledge of or Obtained by a Policy and Charging Rules Function (PCRF) for Needs Based Forwarding of Bearer Session Traffic to Network Nodes," (Unpublished, filed Jan. 14, 2014).
Commonly-assigned, co-pending U.S. Appl. No. 14/086,950 for "Methods, Systems, and Computer Readable Media for a Network Function Virtualization Information Concentrator," (Unpublished, filed Nov. 21, 2013).
Commonly-Assigned, co-pending U.S. Appl. No. 14/034,478 for "Methods, Systems, and Computer Readable Media for Diameter Load and Overload Information and Virtualization," (Unpublished, filed Sep. 23, 2013).
Notification of Transmittal of the International Search Report and the Written Opinion of the International Searching Authority, or the Declaration for International Application No. PCT/US2013/045652 (dated Sep. 17, 2013).
Tschofenig, "Diameter Overload Architecture and Information Model," draft-tschofenig-dime-overload-arch-00.txt, DIME, pp. 1-9 (Jul. 16, 2013).
Notification of Transmittal of the International Search Report and the Written Opinion of the International Searching Authority, or the Declaration for International Application No. PCT/US2013/036664 (dated Jul. 2, 2013).
Campbell, "Diameter Overload Control Solution Issues," draft-campbell-dime-overload-issues-00, pp. 1-16 (Jun. 2013).
"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).
Roach et al., "A Mechanism for Diameter Overload Control," draft-roach-dime-overload-ctrl-03, DIME, pp. 1-49 (May 17, 2013).
Korhonen et al., "The Diameter Overload Control Application (DOCA)," draft-korhonen-dime-ovl-01.txt, Diameter Maintenance and Extensions (DIME), pp. 1-18 (Feb. 25, 2013).
Wendong et al., "Autonomicity Design in OpenFlow Based Software Defined Networking," GC'12 Workshop: The 4th IEEE International Workshop on Management of Emerging Networks and Services, pp. 818-823 (Dec. 3, 2012).
"3rd Generation Partnership Project; Technical Specification Group Services and System Aspects; Policy and charging control architecture (Release 11)," 3GPP TS 23.203, V11.8.0 pp. 1-179 (Dec. 2012).
Fajardo et al., "Diameter Base Protocol," RFC 6733, pp. 1-152 (Oct. 2012).
Mcmurry et al., "Diameter Overload Control Requirements," draft-ietf-dime-overload-reqs-00, pp. 1-25 (Sep. 21, 2012).
"Software-Defined Networking: The New Norm for Networks," ONF White Paper, Open Networking Foundation, pp. 1-12 (Apr. 13, 2012).
"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).
Interview Summary for U.S. Appl. No. 12/425,998 (dated Sep. 14, 2011).
Final Office Action for U.S. Appl. No. 12/425,998 (dated Jun. 8, 2011).
Interview Summary for U.S. Appl. No. 12/425,998 (dated Mar. 1, 2011).
"OpenFlowz Switch Specification," Version 1.1.0 Implemented (Wire Protocol 0x02), www.openflow.org, pp. 1-56 (Feb. 28, 2011).
Chapman et al., "Software architecture definition for on-demand cloud provisioning," Cluster Computing, vol. 15, No. 2, pp. 79-100 Feb. 27, 2011).
Non-Final Office Action for U.S. Appl. No. 12/425,998 (dated Nov. 29, 2010).
Notification of Transmittal of the International Search Report and the Written Opinion of the International Searching Authority, or the Declaration for International Application No. PCT/US2009/041006 (dated Dec. 4, 2009).
3rd Generation Partnership Project, "Technical Specification Group Services and System Aspects; Policy and charging control architecture (Release 9)," 3GPP TS 23.203 V9.3.0 (Dec. 2009).
Dörnemann et al., "On-Demand Resource Provisioning for BPEL Workflows Using Amazon's Elastic Compute Cloud," 9th IEEE/ACM International Symposium on Cluster Computing and the Grid, pp. 140-147 (May 18, 2009).
"Introduction to Evolved Packet Core," White Paper, Alcatel-Lucent, 11 pgs. (2009).
Hilt et al., "Session Initiation Protocol (SIP) Overload Control," IETF, draft-hilt-sipping-overload-02, p. 1-28.
Zhang et al., "Denial of Service Attack and Prevention on SIP VoIP Infrastructures Using DNS Flooding," in Principles, Systems, and Applications of IP Telecummunications (IPTCOMM) (Jul. 2007).
Nahum et al., "Evaluating SIP Server Performance," IBM T.J. Watson Research Center, RC24183 (Feb. 2007).
Rosenberg, "Requirements for Management of Overload in the Session Initiation Protocol," IETF, draft-rosenbergy-sipping-overload-reqs-02, p. 1-22 (Oct. 2006).
Kuthan et al., "Denial of Service Attacks Targeting a SIP VoIP Infrastructure: Attack Scenarios and Prevention mechanisms," IEEE Networks Magazine, vol. 20, No. 5 (Sep. 2006).
Ohta, "Overload Protection in a SIP Signaling Network," in International conference on Internet Surveillance and Protection (ICISP), p. 1-6 (2006).
Donovan et al., "Session Timers in the Session Initiation Protocol (SIP)," Network Working Group, RFC 4028 (Apr. 2005).
Ohta, "Simulation Study of SIP Signaling in an Overload Condition," International Conference for Communications, Internet, and Information Technology, IASTED/ACTA Press, pp. 321-326 (Nov. 22-24, 2004).
Calhoun et al., "Diameter Base Protocol," RFC 3588, pp. 1-147 (Sep. 2003).
Rosenberg et al., "SIP: Session Initiation Protocol," Network Working Group, RFC 3261, http://www.ietf.org/rfc/rfc3261.txt, p. 1-252 (Jun. 2002).
Schulzrinne et al., "SIPstone—Benchmarking SIP Server Performance," (Apr. 2002).
"Signaling Flows for the IP Multimedia Call control Based on Session Initiation Protocol (SIP) and Session Description Protocol (SDP)," 3GPP TS 24.228 V1.1.0, p. 1-653 (Jul. 3-6, 2001).
Grossglauser et al., "On the Relevance of Long-Range Dependence in Network Traffic," IEEE/ACM Transactions on Networking, vol. 7, No. 5, p. 629-640 (Oct. 1999).

(56) References Cited

OTHER PUBLICATIONS

Advisory Action Before the Filing of an Appeal Brief and AFCP 2.0 Decision for U.S. Appl. No. 13/917,200 (dated Jan. 14, 2016).
Non-Final Office Action for U.S. Appl. No. 14/313,610 (dated Jan. 11, 2016).
Non-Final Office Action for U.S. Appl. No. 13/749,655 (dated Dec. 31, 2015).
Applicant-Initiated Interview Summary for U.S. Appl. No. 14/182,864 (dated Dec. 16, 2015).
Extended European Search Report for European Application No. 13776083.1 (dated Dec. 14, 2015).
Non-Final Office Action for U.S. Appl. No. 14/086,950 (dated Dec. 4, 2015).
Supplemental Notice of Allowability for U.S. Appl. No. 13/956,300 (dated Dec. 1, 2015).
Supplemental Notice of Allowability for U.S. Appl. No. 14/182,800 (dated Dec. 1, 2015).
Advisory Action for U.S. Appl. No. 13/863,351 (dated Nov. 25, 2015).
Communication of European Publication Number and Information on the Application of Article 67(3) EPC for European Patent Application No. 14710682.7 (dated Nov. 25, 2015).
Advisory Action for U.S. Appl. No. 14/034,478 (dated Nov. 17, 2015).
Notice of Allowance and Fee(s) Due for U.S. Appl. No. 14/182,800 (dated Nov. 10, 2015).
Final Office Action for U.S. Appl. No. 13/956,307 (dated Nov. 5, 2015).
Communication of European Publication Number and Information on the Application of Article 67(3) EPC for European Patent Application No. 14703974.7 (dated Nov. 4, 2015).
Final Office Action for U.S. Appl. No. 13/956,304 (dated Nov. 3, 2015).
Notice of Allowance and Fee(s) Due & Examiner-Initiated Interview Summary for U.S. Appl. No. 13/956,300 (dated Oct. 23, 2015).
Final Office Action for U.S. Appl. No. 13/917,200 (dated Oct. 22, 2015).
Non-Final Office Action for U.S. Appl. No. 14/182,864 (dated Sep. 23, 2015).
Final Office Action for U.S. Appl. No. 13/863,351 (dated Sep. 11, 2015).
Final Office Action for U.S. Appl. No. 14/034,478 (dated Sep. 8, 2015).
Applicant-Initiated Interview Summary for U.S. Appl. No. 13/956,304 (dated Aug. 5, 2015).
Applicant-Initiated Interview Summary for U.S. Appl. No. 13/917,200 (dated Jul. 27, 2015).
Advisory Action Before the Filing of an Appeal Brief, Examiner-Initiated Interview Summary and AFCP 2.0 Decision for U.S. Appl. No. 13/749,655 (dated Jul. 24, 2015).
Amendment for U.S. Appl. No. 13/749,655 (dated Jul. 6, 2015).
Applicant-Initiated Interview Summary for U.S. Appl. No. 13/956,300 (dated Jun. 29, 2015).
Extended European Search Report for European Application No. 13804779.0 (dated Jan. 19, 2016).
Kempf et al., "Moving the Mobile Evolved Packet Core to the Cloud," 2012 Fifth International Workshop on Selected Topics in Mobile and Wireless Computing, pp. 1-8 (Oct. 8, 2012).
Li Erran et al., "CellSDN: Software-Defined Cellular Networks," ftp://ftp.cs.princeton.edu/techeports/2012/922.pdf, pp. 1-6 (Apr. 20, 2012).
Notice of Allowance and Fee(s) Due for U.S. Appl. No. 14/086,950 (dated Aug. 2, 2017).
First Office Action for Chinese Patent Application No. 201480013195.1 (dated Jul. 5, 2017).
Communication under Rule 71(3) EPC of Intention to Grant for European Application No. 14 710 682.7 (dated Jun. 21, 2017).
Letter Regarding Final Rejection for Japanese Patent Application No. 2015-555185 (dated Jun. 14, 2017).
Applicant-Initiated Interview Summary for U.S. Appl. No. 14/166,790 (dated Jun. 12, 2017).
Letter Regarding Japanese Office Action for Japanese Patent Application No. 2016-531821 (dated Jun. 6, 2017).
Letter Regarding Notice of Grant for Japanese Patent Application No. 2015-517426 (dated May 30, 2017).
Communication under Rule 71(3) EPC Intention to grant for European Patent Application No. 14 703 974.7 (dated May 19, 2017).
Notification of the First Office Action for Chinese Patent Application No. 201380031363.5 (dated May 3, 2017).
Letter Regarding Decision to Grant Chinese Patent Application No. ZL201380027543.6 (dated May 3, 2017).
Notice of Allowance and Fee(s) Due for U.S. Appl. No. 13/863,351 (dated Apr. 20, 2017).
Letter regarding Official Notice of Grant for Japanese Patent Application No. 2015-558193 (dated Feb. 28, 2017).
Non-Final Office Action for U.S. Appl. No. 14/166,790 (dated Feb. 28, 2017).
Letter regaridng Final Decision for Rejection for Japanese Patent Application No. 2015/555185 (dated Feb. 14, 2017).
Nakahira, "Applications for Software Defined Network Technologies on Edge Networks in the Future Network," IEICE Technical Report, vol. 112, No. 230, pp. 109-114 (Oct. 3, 2012).
Letter regarding Official Notice of Grant for Japanese Patent Application No. 2015-558191 (dated Jan. 31, 2017).
Non-Final Office Action for U.S. Appl. No. 14/086,950 (dated Jan. 3, 2017).
Communiction pursuant to Article 94(3) EPC for European Patent Application No. 14 703 974.7 (dated Dec. 21, 2016).
Letter regarding Japanese Office Action for Japanese Patent Application No. 2015-55185 (dated Dec. 20, 2016).
Letter regarding Japanese Office Action for Japanese Patent Application No. 2015-517426 (dated Dec. 6, 2016).
Advisory Action, Applicant-Initiated Interview Summary, and AFCP 2.0 Decision for U.S. Appl. No. 14/166,790 (dated Nov. 30, 2016).
Letter regarding notice of grant for Japanese Patent Application No. 2015/505985 (dated Nov. 29, 2016).
Communication of European publication No. and information on the application of Article 67(3) EPC for European Application No. 15703372.1 (dated Nov. 9, 2016).
Applicant-Initiated Interview Summary for U.S. Appl. No. 13/863,351 (dated Nov. 9, 2016).
Applicant-Initiated Interview Summary for U.S. Appl. No. 14/166,790 (dated Oct. 28, 2016).
Notification of the First Office Action for Chinese Patent Application No. 201380027543.6 (dated Sep. 30, 2016).
Advisory Action Before the Filing of an Appeal Brief for U.S. Appl. No. 14/086,950 (dated Sep. 9, 2016).
Communication of European publication No. and information on the application of Article 67(3) EPC for European Application No. 14812837.4 (dated Sep. 7, 2016).
Letter regarding Office Action for Japanese Patent Application No. 2015-505985 (dated Sep. 6, 2016).
Communication of European publication No. and information on the application of Article 67(3) EPC for European Application No. 14812840.8 (dated Aug. 31, 2016).
Letter Regarding Office Action for Japanese Patent Application No. 2015-558193 (dated Aug. 30, 2016).
Letter Regarding Office Action for Japanese Patent Application No. 2015-558191 (dated Aug. 30, 2016).
Final Office Action for U.S. Appl. No. 13/863,351 (dated Aug. 26, 2016).
Notice of Allowance and Fee(s) Due and Examiner-Initiated Interview Summary for U.S. Patent Applicaton U.S. Appl. No. 14/034,478 (dated Aug. 25, 2016).
Letter Regarding Office Action for Japanese Patent Application No. 2015-555185 (dated Aug. 23, 2016).
Notice of Allowance and Fee(s) Due, Applicant-Initiated Interview Summary, and AFCP 2.0 Decision for U.S. Appl. No. 13/749,655 (dated Aug. 22, 2016).
Final Office Action for U.S. Appl. No. 14/166,790 (dated Aug. 11, 2016).

(56) References Cited

OTHER PUBLICATIONS

Business Communication, Kabushikikaisha Business-Communication-sha (Japan), vol. 49, No. 11, pp. 60-61 (Nov. 1, 2012).
Hayashi et al., "Research and Development for Supporting a Generic Technology of a Cloud in the Future," NEC Technical Report, vol. 63, No. 2, NEC Corporation, p. 124-128 (Apr. 23, 2010).
Advisory Action and Applicant-Initiated Interview Summary for U.S. Appl. No. 14/166,790 (dated Dec. 28, 2017).
Notification of Second Office Action for Chinese Application No. 201380031363.5 (dated Dec. 25, 2017).
Notification of the First Office Action for Chinese Application No. 201480017591.1 (dated Dec. 1, 2017).
Communication pursuant to Article 94(3) EPC for European Application No. 14 709 036.9 (dated Nov. 27, 2017).
Decision to grant a European patent pursuant to Article 97(1) EPC for European Patent Application No. 14710682.7 (dated Nov. 6, 2017).
Notification of the First Office Action for Chinese Application No. 201480017586.0 (dated Nov. 3, 2017).
Notice of Allowance and Fee(s) Due for U.S. Appl. No. 14/692,710 (dated Nov. 1, 2017).
Final Office Action for U.S. Appl. No. 14/166,790 (dated Sep. 20, 2017).
Decision to grant a European patent pursuant to Article 97(1) EPC for European Patent Application No. 14703974.7 (dated Sep. 14, 2017).
"3rd Generation Partnership Project; Technical Specification Group Services and System Aspects; Policy and Charging Control Architecture (Release 11)", 3GPP TS 23.203, V11.1.0, pp. 1-136, (Mar. 2011).
Letter Regarding Notice of Grant for Japanese Patent Application No. 2016-531821 (dated Feb. 6, 2018).
Communication of European publication number and information on the application of Article 67(3) EPC for European Patent Application No. 14755210.3 (dated Jul. 6, 2016).
Final Office Action for U.S. Appl. No. 14/086,950 (dated Jul. 1, 2016).
Applicant-Initiated Interview Summary for U.S. Appl. No. 13/863,351 (dated May 27, 2016).
Final Office Action for U.S. Appl. No. 13/749,655 (dated May 25, 2016).
Notice of Allowance and Fee(s) Due for U.S. Appl. No. 14/313,610 (dated May 20, 2016).
Communication of European Publication No. and Information on the Application of Article 67(3) EPC for European Patent Application No. 14755208.7 (dated May 11, 2016).
Applicant-Initiated Interview Summary for U.S. Appl. No. 14/313,610 (dated Apr. 26, 2016).
Applicant-Initiated Interview Summary for U.S. Appl. No. 14/166,790 (dated Apr. 14, 2016).
Non-Final Office Action for U.S. Appl. No. 14/034,478 (dated Apr. 5, 2016).
Applicant-Initiated Interview Summary for U.S. Appl. No. 13/749,655 (dated Mar. 31, 2016).
Notice of Allowance and Fee(s) Due for U.S. Appl. No. 13/917,200 (dated Mar. 28, 2016).
Non-Final Office Action for U.S. Appl. No. 13/863,351 (dated Mar. 17, 2016).
Notice of Allowance and Fee(s) Due for U.S. Appl. No. 13/956,304 (dated Mar. 16, 2016).
Notice of Allowance and Fee(s) Due for U.S. Appl. No. 14/182,864 (dated Feb. 17, 2016).
Notice of Allowance and Fee(s) Due and Examiner-Initiated Interview Summary for U.S. Appl. No. 13/956,307 (dated Feb. 12, 2016).
Non-Final Office Action for U.S. Appl. No. 14/166,790 (dated Feb. 2, 2016).
Applicant-Initiated Interview Summary for U.S. Appl. No. 13/956,304 (dated Feb. 1, 2016).

Communication under Rule 71(3) EPC of Intention to Grant for European Patent Application Serial No. 14 709 036.9 (dated Mar. 15, 2018).
Communication pursuant to Article 94(3) EPC for European Patent Application Serial No. 14 812 840.8 (dated Mar. 12, 2018).
Notification of the Second Office Action for Chinese Patent Application No. 201480013195.1 (dated Mar. 12, 2018).
Notification of the First Office Action for Chinese Patent Application Serial No. 201480064526.4 (dated Oct. 10, 2018).
Letter Regarding Notice of Grant for Japanese Patent Application Serial No. 2015-555185 (dated Oct. 2, 2018).
Office Action for Japanese Patent Application Serial No. 2016-534732 (dated Sep. 18, 2018).
Office Action for Japanese Patent Application Serial No. 2016-533035 (dated Sep. 11, 2018).
Office Action for Japanese Patent Application Serial No. 2016-548703 (dated Aug. 28, 2018).
Summons to attend oral proceedings pursuant to Rule 115(1) EPC for European Patent Application Serial No. 14812840.8 (Aug. 22, 2018).
Office Action for Chinese Patent Application Serial No. 201480017591.1 (dated Aug. 21, 2018).
Tamura et al., "Efforts for Realization of Highly Reliable and Available Core Network Using Network Virtualization," NTT Docomo Technical Journal, The Telecommunications Association, pp. 1-10 (Apr. 1, 2018).
"Network Function Virtualization (NFV) Management Orchestration," GS NFV-MAN 001 V0.0.11, pp. 1-76 (Oct. 2013).
"3rd Generation Partnership Project; TSG SA WG2 Meeting #94," Secretary of SA WG2, pp. 1-3 (2013).
Yap et al., "Blueprint for Introducing Innovation into the Wireless Networks We Use Every Day," OpenFlow, pp. 1-8 (Oct. 12, 2009).
Letter Regarding Notification to Grant for Chinese Patent Application Serial No. ZL201380031363.5 (dated May 14, 2018).
Notification of the First Office Action for Chinese Patent Application No. 201480063468.3 (dated Aug. 1, 2018).
Examiner's Answer for U.S. Appl. No. 14/166,790 (dated Jul. 27, 2018).
Decision to grant a European patent pursuant to Article 97(1) EPC for European Patent Application No. 14709036.9 (dated Jul. 26, 2018).
Office Action for Japanese Patent Application Serial No. 2016-544321 (dated Jul. 17, 2018).
Notification of the Second Office Action for Chinese Patent Application No. 201480017586.0 (dated Jul. 10, 2018).
Office Action for Chinese Patent Application Serial No. 201480052209.0 (dated Jul. 3, 2018).
Letter Regarding Notification to Grant for Chinese Patent Application Serial No. ZL201480013195.1 (dated Jul. 2, 2018).
Letter Regarding Notification to Grant for Chinese Patent Application Serial No. ZL201480017591.1 (dated Mar. 8, 2019).
Letter Regarding Notice of Grant for Japanese Application Serial No. 2016-534732 (dated Mar. 5, 2019).
Letter Regarding Notice of Grant for Chinese Patent Application Serial No. ZL201480063468.3 (dated Mar. 5, 2019).
Third Office Action for Chinese Patent Application Serial No. 201480049349.2 (dated Feb. 28, 2019).
First Examination Report for Indian Patent Application Serial No. 201647014786 (dated Feb. 27, 2019).
Letter Regarding Second Office Action for Japanese Patent Application Serial No. 2016-548703 (dated Jan. 29, 2019).
Communication pursuant to Article 94(3) EPC for European Application Serial No. 13 776 083.1 (dated Jan. 29, 2019).
Letter Regarding Notification to Grant for Chinese Patent Application Serial No. ZL201480017586.0 (dated Jan. 24, 2019).
Letter Regarding Office Action for Japanese Patent Application Serial No. 2016-544321 (dated Jan. 15, 2019).
Communication pursuant to Article 94(3) EPC for European Application Serial No. 14 812 837.4 (dated Dec. 6, 2018).
Decision to grant a European patent pursuant to Article 97(1) EPC for European Patent Application No. 13804779.0 (dated Nov. 15, 2018).

(56) References Cited

OTHER PUBLICATIONS

Notification of the First Office Action for Chinese Patent Application Serial No. 201580005818.5 (dated Nov. 2, 2018).
Notification of the Second Office Action for Chinese Patent Application Serial No. 201480049349.2 (dated Oct. 24, 2018).
Communication under Rule 71(3) EPC for European Application No. 13 804 779.0 (dated Jul. 6, 2018).
Higuchi et al., "Resource Control Method for Standby Virtual Machine," The Institute of Electronics, Information and Communication Engineers, The 2010 IEICE Communication Society Conference Collection of papers 2, pp. 1-6 (Aug. 31, 2010).
Notice of Grant for Japanese Patent Application Serial No. 2016-533035 (dated Jun. 25, 2019).
Decision of Refusal for Japanese Patent Application Serial No. 2016-544321 (dated May 14, 2019).
Examination Report for Indian Patent Application Serial No. 201647004536 (dated May 8, 2019).
Communication under Rule 71(3) EPC Intention to Grant for European Patent Application Serial No. 14 812 840.8 (dated May 7, 2019).
Notification to Grant for Chinese Patent Application Serial No. ZL201480049349.2 (dated May 7, 2019).
Notification to Grant for Chinese Patent Application Serial No. ZL201480064526.4 (dated Apr. 10, 2019).
Second Office Action for Chinese Patent Application Serial No. ZL201480052209.0 (dated Apr. 3, 2019).
First Examination Report for Indian Patent Application Serial No. 7474/CHENP/2014 (dated Mar. 28, 2019).
Communication pursuant to Article 94(3) EPC for European Patent Application Serial No. 14 755 208.7 (dated Feb. 26, 2019).
Examination Report for Indian Patent Application Serial No. 4971/CHENP/2015 (dated Mar. 26, 2019).
Examination Report for Indian Patent Application Serial No. 8629/CHENP/2014 (dated Sep. 27, 2019).
Subsequent Examination Report for Indian Patent Application Serial No. 7474/CHENP/2014 (dated Sep. 25, 2019).
Decision to grant a European patent pursuant to Article 97(1) EPC for European Patent Application Serial No. 14812840.8 (dated Sep. 12, 2019).
First Examination Report for Indian Patent Application Serial No. 4381/CHENP/2015 (dated Aug. 28, 2019).
Communication pursuant to Article 94(3) EPC for European Patent Application Serial No. 15 703 372.1 (dated Jul. 30, 2019).
Decision on Appeal for U.S. Appl. No. 14/166,790 (dated Aug. 23, 2019).
Communication pursuant to Article 94(3) EPC for European Patent Application Serial No. 14 755 210.3 (dated Jul. 26, 2019).
Notification of the Second Office Action for Chinese Patent Application Serial No. 201580005818.5 (dated Jul. 11, 2019).
Letter regarding Notice of Grant for Japanese Patent Application Serial No. 2016-548703 (dated Jul. 2, 2019).
Communication under Rule 71(3) EPC for European Patent Application Serial No. 14 812 837.4 (dated Nov. 19, 2019).
Communication under Rule 71(3) EPC for European Patent Application Serial No. 14 755 210.3 (dated Nov. 6, 2019).
Letter regarding Notification of Grant for Chinese Patent Application Serial No. ZL201580005818.5 (dated Nov. 6, 2019).
Notification of the Third Office Action for Chinese Patent Application Serial No. 201480052209.0 (dated Nov. 5, 2019).
Examination Report for Indian Patent Application Serial No. 4970/CHENP/2015 (dated Oct. 11, 2019).
Notification of the Fourth Office Action for Chinese Application Serial No. 201480052209.0 (dated May 6, 2020).
Letter Regarding Notification of Grant for Chinese Application Serial No. 201480052209.0 (dated Aug. 17, 2020).
Examination Report for Indian Patent Application Serial No. 201647023311 (dated Mar. 20, 2020).
Letter regarding Notification of Grant for Chinese Patent Application Serial No. ZL.201480052209.0 (dated Oct. 31, 2020).
Office Action for Japanese Patent Application Serial No. 2016-544321 (dated Oct. 6, 2020).
Communication under Rule 71(3) EPC Intention to grant for European Patent Application No. 14 755 208.7 (dated Nov. 2, 2020).
Decision to grant a European patent pursuant to Article 97(1) EPC for European Patent Application Serial No. 14812837.4 (dated Apr. 2, 2020).
Decision to grant a European patent pursuant to Article 97(1) EPC for European Patent Application Serial No. 14755210.3 (dated Mar. 12, 2020).
Decision for Indian Patent Application Serial No. 7474/CHENP/2014 (Feb. 21, 2020).
Examination Report for Indian Patent Application Serial No. 201647015819 (dated Feb. 13, 2020).
Examination Report for Indian Patent Application Serial No. 201647002684 (dated Jan. 16, 2020).
Hearing Notice for Indian Patent Application Serial No. 4381/CHENP/2015 (dated Jul. 6, 2021).
Hearing Notice in Reference of Indian Patent Application Serial No. 4971/CHENP/2015 (dated Oct. 28, 2020).
Patent Certificate for Indian Patent No. 356772 (Jan. 27. 2021).
Office action for European Patent. Application Serial No. 13776083.1 (dated Jan. 20, 2021).
Notice of Allowance for Japanese Patent Application Serial No. 2016-544321 (dated Apr. 13, 2021).
Decision to grant a European patent pursuant to Article 97(1) EPC for European Patent Application No. 14 755 208.7 ((dated Mar. 12, 2021).
Decision to grant a European patent pursuant to Rule 71(3) EPC for European Patent Application No. 13 776 083.1 (dated Nov. 17, 2021).

\* cited by examiner

ROUTING TABLE DATA

| SUBSCRIBER ID | NETWORK NODE URI | NETWORK NODE FQDN | NETWORK NODE IP ADDRESS |
|---|---|---|---|
| 3100123534643342 | aaa://host.example.com:1813;transport=udp;protocol=radius | | |
| 314024* | hss://hss1.vzw.net:1815;transport=udp;protocol=radius | HSS1@VZW.NET | 192.53.34.11 PORT 1815 |
| 2204123534643342 | | | 192.23.43.12 PORT 64 |
| 4587123534684745 | hss://hss2.vzw.net:1815;transport=udp;protocol=radius | HSS2@VZW.NET | 192.53.34.12 PORT 1815 |
| 8764523534874454 | | GW@SPRINT.NET | 194.25.23.4 PORT 534 |
| 567534* | fgw://pdngw3.att.com:1819;transport=udp;protocol=diameter | PDNGW3.@ATT.COM | |

ROUTING TABLE DATA

| SUBSCRIBER ID | NETWORK NODE URI | NETWORK NODE FQDN | NETWORK NODE IP ADDRESS |
|---|---|---|---|
| 310012353464342 | aaa://host.example.com:1813;transport=udp;protocol=radius | | |
| 314024* | hss://hss3.vzw.net:1815;transport=udp;protocol=radius | HSS3@VZW.NET | 192.53.34.41 PORT 1815 |
| 220412353464342 | | | 192.23.43.12 PORT 64 |
| 458712353468745 | hss://hss4.vzw.net:1815;transport=udp;protocol=radius | HSS4@VZW.NET | 192.53.34.42 PORT 1815 |
| 876452353487454 | | GW@SPRINT.NET | 194.25.23.4 PORT 534 |
| 567534* | fgw://pdngw3.att.com:1819;transport=udp;protocol=diameter | PDNGW3.@ATT.COM | |

METHODS, SYSTEMS, AND COMPUTER READABLE MEDIA FOR DIAMETER ROUTING USING SOFTWARE DEFINED NETWORK (SDN) FUNCTIONALITY

TECHNICAL FIELD

The subject matter described herein relates to determining policy information. More specifically, the subject matter relates to methods, systems, and computer readable media for Diameter routing using software defined network (SDN) functionality.

BACKGROUND

In telecommunications networks, global Internet protocol traffic is increasing at a rate of forty to fifty percent per year. In order to retain subscribers, it is desirable for service providers to keep monthly charges to subscribers relatively unchanged. Keeping charges constant with increasing traffic requires a reduction in expenses. For example, with a forty percent increase in traffic, service providers must reduce capital expenses and operational expenses by forty to fifty percent per gigabyte per second per year to achieve relatively constant pricing.

One possible method for reducing capital and operational expenses is to use software defined networks (SDNs). SDNs can be used to manage flows, control switches, control network access, and track user location and motion. SDNs can also be used to efficiently utilize network components. For example, SDNs may be used to power off unused equipment during non-peak periods to conserve energy.

Some SDN models may centralize the control of network elements, such as routers and switches, by removing intelligence from the routers and switches and placing that intelligence in a centralized location. One such effort to provide centralized control of routers and switches is the OpenFlow architecture described in the OpenFlow Switch Specification, Version 1.1.0, Feb. 28, 2011, the disclosure of which is incorporated herein by reference in its entirety. Conventionally, SDN architecture has not been used to control telecommunications network elements.

Accordingly, a need exists for methods, systems, and computer readable media for Diameter routing using SDN functionality.

SUMMARY

Methods, systems, and computer readable media for routing a Diameter message are disclosed. According to one method, the method occurs at a Diameter routing node. The method includes receiving, from a Diameter routing controller (DRC) via an SDN related interface, Diameter routing information, wherein the Diameter routing information is determined using application layer information. The method also includes routing a Diameter message using the Diameter routing information.

According to one system, the system includes a Diameter routing node. The Diameter routing node comprises an SDN related interface configured to receive, from a DRC, Diameter routing information, wherein the Diameter routing information is determined using application layer information. The Diameter routing node also includes a routing module configured to route a Diameter message using the Diameter routing information.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIGS. 3A and 3B are diagrams illustrating exemplary Diameter routing information according to an embodiment of the subject matter described herein;

DETAILED DESCRIPTION

Figure 1:
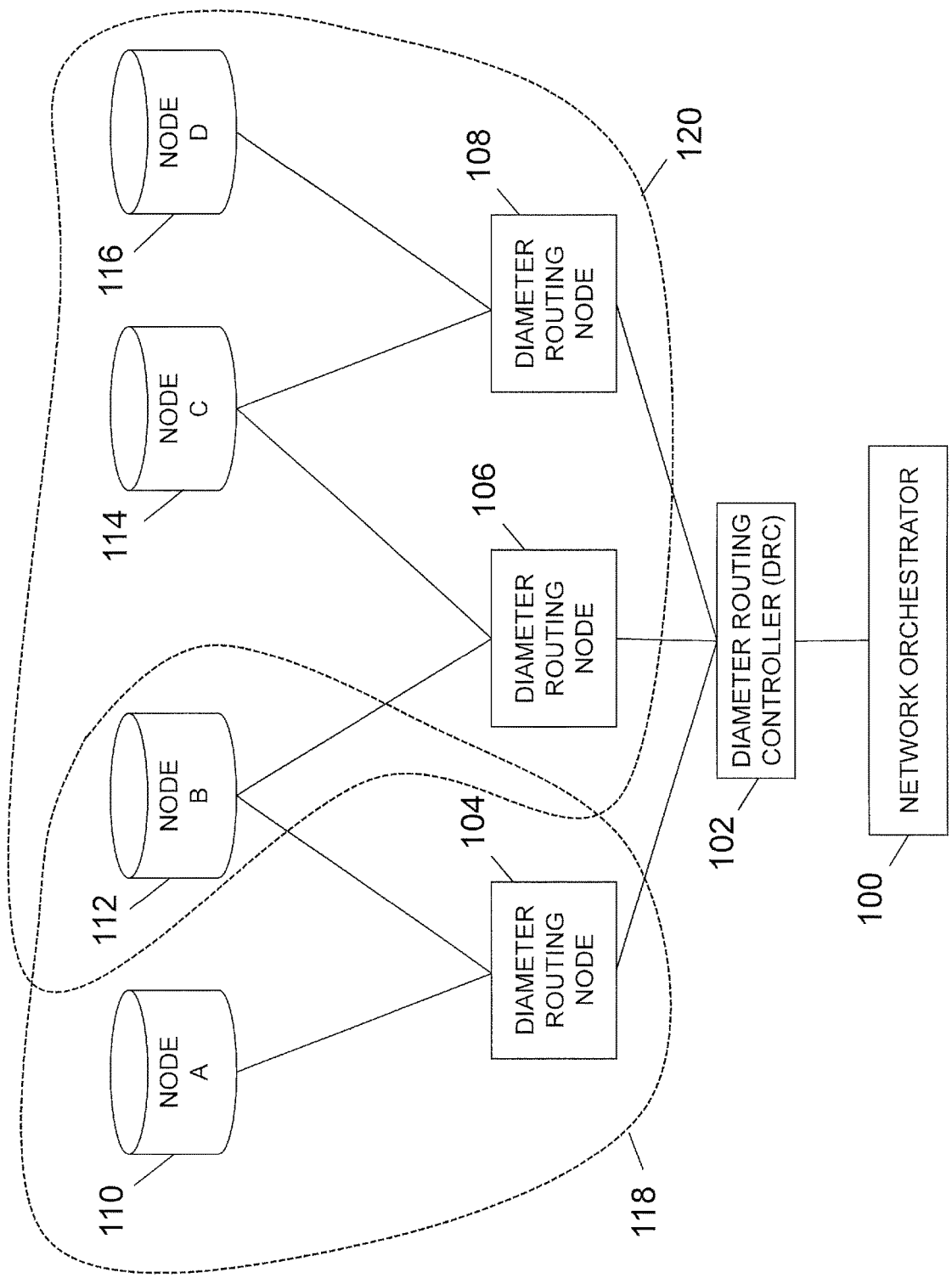
FIG. 1 is a diagram illustrating exemplary SDN components according to an embodiment of the subject matter described herein.

The subject matter described herein discloses methods, systems, and computer readable media for Diameter routing using SDN functionality. Diameter is an authentication, authorization, and accounting (AAA) application layer protocol for computer networks, and is a successor to RADIUS. The Diameter base protocol is defined in IETF RFC 6733, the disclosure of which is incorporated by reference herein in its entirety. Diameter communications may use a request-answer message exchange. Diameter routing involves routing of request messages in one direction and answer messages in the reverse direction.

In accordance with some aspects of the subject matter described herein, a Diameter routing node may use SDN functionality and/or SDN components. For example, a Diameter router node (e.g., a Diameter routing agent (DRA) or Diameter signaling router (DSR)) may communicate with a Diameter routing controller (DRC). In this example, the Diameter routing node may receive routing decisions and/or Diameter routing information from the DRC. In some embodiments, the DRC and the Diameter routing node may communicate using an SDN related interface, such as an OpenFlow protocol interface or a Diameter protocol interface.

In accordance with some aspects of the subject matter described herein, a Diameter routing node may route Diameter messages without performing application layer (e.g., open systems interconnection (OSI) model layer 7) analysis. For example, an initial Diameter request message may be received by a Diameter routing node. The Diameter routing node may query a DRC (e.g., via an SDN related interface) for Diameter routing information associated with the Diameter request message. In this example, the Diameter routing information may include an Internet protocol (IP) address and/or port information associated with a destination node. The Diameter routing node may associate Diameter routing information received from the DRC (e.g., via an SDN related interface) and non-application layer information associated with the Diameter message (e.g., an IP data tuple associated with an IP packet containing the Diameter message). For example, an IP data tuple may include a source IP address, a destination IP address, a source port number, a destination port number, and/or a transport protocol. In this example, the IP data tuple may be usable to identify related Diameter session or flows and may be referred to as a session data flow (SDF) filters. Using an IP data tuple or other information, the Diameter routing node may identify and route related Diameter messages to the same destination node indicated by the previously received Diameter routing information, e.g., without querying the DRC or performing application layer analysis on the related Diameter messages.

Advantageously, by using SDN functionality and/or SDN components, a Diameter routing node may route Diameter messages while conserving resources, e.g., resources typically used when performing application layer processing. By querying and receiving routing decisions and/or Diameter routing information via an SDN related interface, a Diameter routing node in accordance with aspects of the subject matter described herein may conserve more resources than a conventional Diameter routing node.

Additionally, by using SDN functionality and/or SDN components, information about newly (e.g., recently) available Diameter resources may be provided to a Diameter routing node. For example, Diameter routing information about a newly available Diameter network node (e.g., a Diameter application server) may be provided to a Diameter routing node, thereby allowing the Diameter routing node to dynamically route Diameter messages to the newly available Diameter resource.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating exemplary SDN components according to an embodiment of the subject matter described herein. In some embodiments, various nodes may be associated with or controlled by SDN functionality. Referring to FIG. 1, exemplary SDN components may include a network orchestrator 100, a DRC 102, Diameter routing node (DRN) 104-108, and/or nodes 110-116. Network orchestrator 100 may represent any suitable entity (e.g., software executing on a processor) for monitoring network events and/or hardware events. For example, network orchestrator 100 may communicate with various entities (e.g., (e.g., various nodes, network operators, or other sources) and may determine whether a node, a resource, or a network segment is overloaded, experiencing problems, or operating normally. Network orchestrator 100 may use received or derived information to predict future conditions (e.g., network congestion or node failures). Network orchestrator 100 may include functionality for allocating or reallocating various network resources, such as Diameter resources (e.g., Diameter network functions, Diameter nodes, or resources at Diameter functions or nodes), based on monitored or predicted conditions. For example, network orchestrator 100 may include virtualization functionality for dynamically allocating or reallocate hardware resources associated with a physical device and for instantiating needed resource instances using hardware associated with the physical device.

DRC 102 may represent any suitable entity (e.g., software executing on a processor) for performing Diameter routing decisions and/or providing Diameter routing information. For example, DRC 102 may communicate with one or more of DRNs 104-108 via an SDN related interface. Exemplary SDN related interfaces may include an OpenFlow protocol interface or a Diameter protocol interface. DRC 102 may receive Diameter messages or related information from one or more of DRNs 104-108. DRC 102 may determine an appropriate destination for received Diameter messages, e.g., by analyzing or inspecting application layer information (e.g., a Diameter realm identifier (ID), a Diameter command code, a Diameter node name, etc.) associated with the Diameter messages. DRC 102 may provide Diameter routing information to one or more of DRNs 104-108, e.g., via an SDN related interface. Exemplary Diameter routing information may include address information and/or other identifying information associated with a destination, such as an IP address and/or port information, a uniform resource identifier (URI), a fully qualified domain name (FQDN), or other information.

Each of DRNs 104-108 may represent any suitable entity (e.g., software executing on a processor) for routing Diameter signaling messages. For example, each of DRNs 104-108 may be an LTE signaling router, an LTE Diameter signaling router, a Diameter proxy, a Diameter agent, a Diameter routing agent, a Diameter relay agent, Diameter translation agent, or a Diameter redirect agent. Each of DRNs 104-108 may include functionality for processing various messages. In some embodiments, such functionality may be included in one or more modules (e.g., a firewall module, a network address translation (NAT) module, a subscriber location module, and/or a routing module). It will be appreciated that functionality and modules as used herein refers to hardware, software, firmware, or any combination of hardware, software, and firmware for implementing the features described herein.

Each of DRNs 104-108 may include functionality for receiving, processing, and/or switching or routing various messages and may include various communications interfaces for communicating with Diameter nodes, e.g., 3rd Generation Partnership Project (3GPP) LTE communications interfaces and other (e.g., non-LTE) communications interfaces. Exemplary communications interfaces for communicating with Diameter nodes may include an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

Each of DRNs 104-108 may include functionality for receiving, processing, and/or switching or routing SDN related messages and may include various communications interfaces for communicating with SDN related nodes or components, e.g., a Diameter protocol interface or an Open-Flow protocol interface.

In some embodiments, each of DRNs 104-108 may be configurable for communicating with DRC 102 and/or network orchestrator 100, e.g., via an SDN related interface. For example, DRN 104 may request or query DRC 102 for Diameter routing information. DRC 102 may determine appropriate Diameter routing information and provide the Diameter routing information to DRN 104. In response to receiving the Diameter routing information, DRN 104 may store the Diameter routing information in a local or otherwise accessible routing table and may use the Diameter routing information for routing Diameter messages. In another example, DRN 104 may provide statistics or other status information to network orchestrator 100. Network orchestrator 100 may use the information to direct, provision, or control DRN 104, DRC 102, and/or other nodes, e.g., by triggering DRC 102 to provide Diameter routing information to DRN 104 or by sending SDN related commands directly to DRN 104.

In some embodiments, SDN related messages (e.g., from DRC 102 or network orchestrator 100) may be solicited (e.g., by DRN 104 sending a request message) or may be unsolicited (e.g., an SDN related message may be sent to DRN 104 for provisioning a Diameter routing table without a corresponding request message from DRN 104).

Each of DRNs 104-108 may facilitate communication between Diameter clients and Diameter servers. For example, a Diameter client may send a Diameter request message (e.g., a Diameter session establishment request message) to DRN 108. The Diameter request message may require one or more services from a Diameter server. DRN 108 may route, relay, and/or translate requests or responses between the Diameter client and the Diameter server. After receiving and processing the Diameter request message, the Diameter server may send a Diameter response message (e.g., a Diameter session establishment response message) to DRN 108. The Diameter response message may be sent in response to the Diameter request message originated by the Diameter client. DRN 108 may provide the Diameter response message to the Diameter client, e.g., using Diameter routing information.

Each of nodes 110-116 may represent any suitable entity (e.g., software executing on a processor) capable of communicating using a Diameter-based protocol. For example, each of nodes 110-116 may be a Diameter client, a Diameter server, a mobility management entity (MME), a home subscriber server (HSS), an authentication, authorization, and/or accounting (AAA) server, a Diameter application server, a subscriber profile repository (SPR), or other Diameter node. Each of nodes 110-116 may include functionality for processing various messages. For example, nodes 110-116 may represent a plurality of HSSs, where each HSS contains subscriber-related information, such as user identification, control information for user authentication and authorization, location information, and user profile data.

In some embodiments, DRNs 104-108 and nodes 110-116 may be associated with SDNs 118 and 120. Each of SDN 118 and 120 may represent a network containing one or more nodes (or virtual nodes). For example, network orchestrator 100 may allocate or trigger allocation of resources (e.g., using DRC 102) and configure resources such that DRN 104 is associated with SDN 118 and DRNs 106 and 108 are associated with SDN 120. In this example, DRC 102 may provide Diameter routing information or configure routing table data such that DRN 104 routes Diameter messages to nodes 110 and 112, while DRC 102 may provide Diameter routing information or configure routing table data such that DRNs 106 and 108 route Diameter messages to nodes 112, 114, and 116.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity, e.g., network orchestrator 100 and DRC 102 may be included in a single policy and charging rules function (PCRF) node or a single Diameter Routing Agent (DRA) node. In a second example, a node and/or function may be located at or implemented by two or more nodes, e.g., DRC 102 may be distributed across multiple nodes for handling multiple SDNs 118 and 120.

Figure 2:
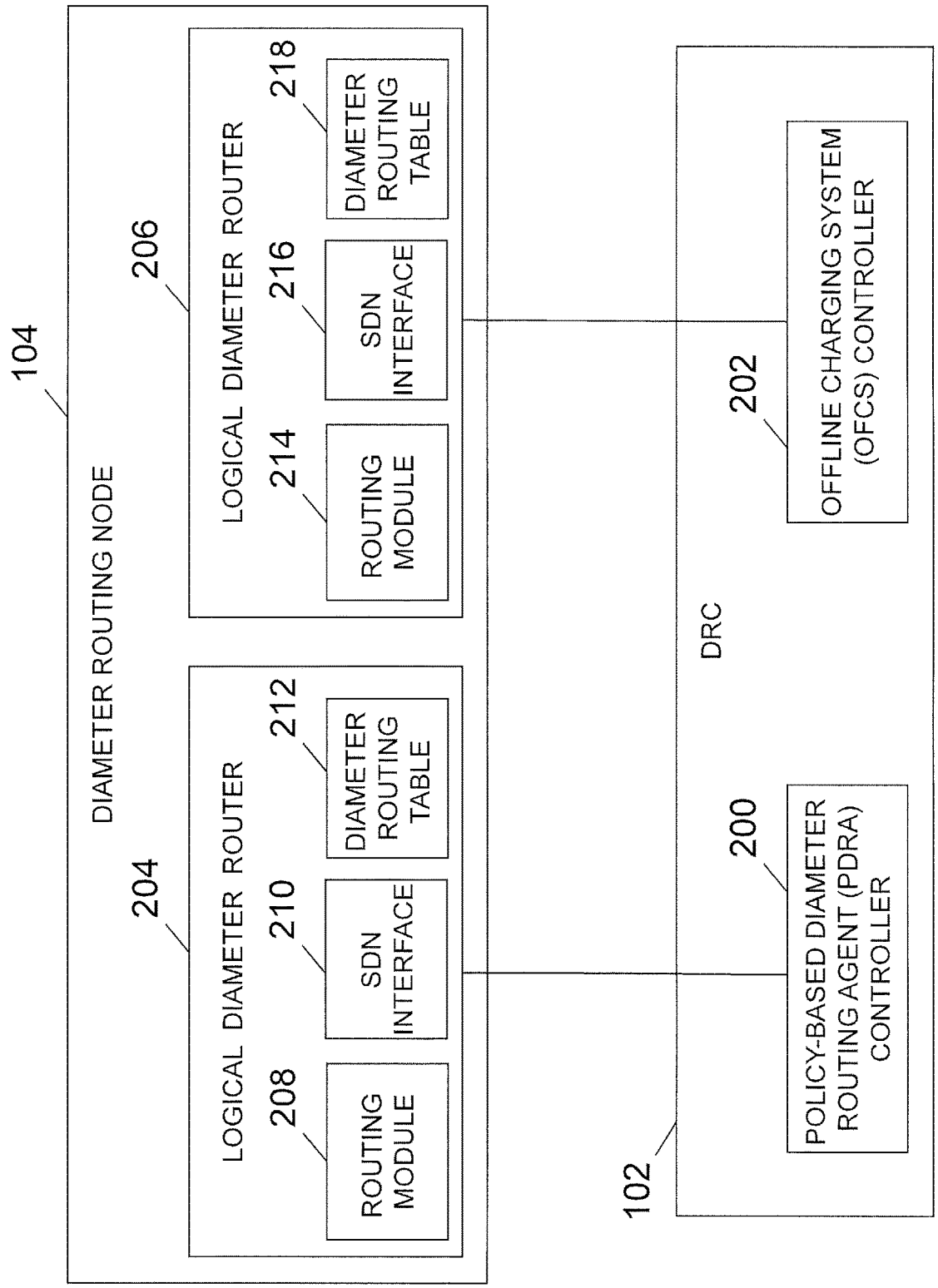
FIG. 2 is a diagram illustrating an exemplary DRC and an exemplary Diameter routing node (DRN) according to an embodiment of the subject matter described herein.

FIG. 2 is a diagram illustrating exemplary DRC 102 and exemplary DRN 104 according to an embodiment of the subject matter described herein. In some embodiments, DRC 102 and DRC 104 may be configurable to include multiple logical nodes, modules, or functions.

Referring to FIG. 2, DRC 102 may include a policy-based Diameter routing agent (PDRA) controller 200 and an offline charging system (OFCS) controller 202. PDRA controller 200 may represent any suitable entity for determining and/or providing Diameter routing information. PDRA controller 200 may include or access a PCRF. For example, PDRA controller 200 may use policy information provided by a PCRF in determining policy decisions. In this example, policy information may include policy and charging control (PCC) rules and may indicate that certain subscribers receive enhanced services or features. Using policy information, PDRA controller 200 may route Diameter messages associated with a particular subscriber or session to an appropriate destination.

OFCS controller 202 may represent any suitable entity for determining and/or providing charging related information. OFCS controller 202 may include or access a charging trigger function (CTF), a charging data function (CDF), and/or a charging gateway function (CGF). For example, OFCS controller 202 may determine how a subscriber, session, or service should be charged or billed. In this example, charging information may be provided to DRN 104 or logical Diameter router 206 such that a particular session can be billed appropriately, e.g., without requiring DRN 104 to perform its own OFCS related analysis.

DRN 104 may include logical Diameter routers 204 and 206. For example, each of logical Diameter routers 204 and 206 may use physical resources associated with DRN 104. Each of logical Diameter routers 204 and 206 may include modules, memory, and/or other components associated with routing Diameter messages. For example, logical Diameter router 204 may include a routing module 208, an SDN interface 210, and a Diameter routing table 212 and logical Diameter router 206 may include a routing module 214, an SDN interface 216, and a Diameter routing table 218.

Each of routing modules 208 and 214 may represent any suitable entity for routing Diameter messages. For example, routing module 208 or routing module 214 may use one or more physical interfaces for receiving and/or sending Diameter messages and may include functionality for routing a Diameter message to a destination using Diameter routing information, e.g., received via SDN interface 210 and/or stored in Diameter routing table 212.

Each of SDN interfaces 210 and 216 may represent any suitable entity for receiving and/or sending SDN related messages. For example, SDN interface 210 or SDN interface 216 may include one or more physical interfaces for communicating with DRC 102, PDRA controller 200, OFCS controller 202, or network orchestrator 100.

Each of Diameter routing tables 212 and 218 may represent any suitable entity (e.g., a non-transitory computer readable medium) for storing or maintaining Diameter routing information. For example, Diameter routing tables 212 and 218 may include associations between Diameter sessions, Diameter services or applications, or subscriber IDs and network node address information.

FIG. 3A is a diagram illustrating exemplary Diameter routing information 300 according to an embodiment of the subject matter described herein. In some embodiments, exemplary routing data 300 may be accessed and/or stored by DRNs 104, 106, and/or 108 using various data structures.

Referring to FIG. 3A, Diameter routing information 300 may include associations between subscriber IDs and network node address information and may be depicted using a table. The routing table of FIG. 3A may include a subscriber ID field, a network node URI field, a network node FQDN field, and a network node IP address field. Subscriber ID field may include subscriber or device identifiers (or portions thereof), such as an international mobile subscriber identity (IMSI), a mobile subscriber integrated services digital network (MSISDN) number, a short code, a URI, IMEI, and a mobile identification number (MIN). Network node URI, FQDN, and IP address fields represents fields for storing address information or routing information for nodes.

As depicted in FIG. 3A, Diameter routing information 300 may indicate an association between an IMSI (e.g., IMSI value: "310012353464342") and a network node associated with a URI (e.g., URI value: "aaa://host.example-.com:1813;transport=udp;protocol=radius"). Diameter routing information 300 may also indicate a second association between a portion of an IMSI (e.g., IMSI portion value: "314024*") and a network node associated with a URI (e.g., URI value: "hss://hss1.vzw.net:1815;transport=udp; protocol=radius;protocol=radius"), an FQDN (e.g., FQDN value: "HSS1@VZW.NET"), and an IP address (e.g., IP address value: "192.53.34.11 port number: 1815"). By using a portion of an IMSI followed by a wildcard '*' character, the second association may indicate a group of subscribers (e.g., subscribers having the same initial 6 digits for their IMSI values) that are associated with a particular node. Diameter routing information 300 may also indicate a third association between a portion of an IMSI (e.g., IMSI portion value: "220412353464342") and a network node associated with an IP address (e.g., IP address value: "192.23.43.12 port number: 64"). Diameter routing information 300 may also indicate other associations between IMSIs or portions thereof and one or more network node identifiers for identifying associated nodes.

In some embodiments, Diameter routing information 300 may indicate associations between Diameter sessions and network nodes. For example, a first Diameter session may be associated with first node, while a second session may be associated with a second node. In some embodiments, Diameter routing information 300 may indicate associations between Diameter services or applications and network nodes. For example, a registration service may be associated with a first node, while a credit control service may be associated with a second node.

In some embodiments, DRC 102 and/or network orchestrator 100 may provide Diameter routing information 300 to DRNs 104, 106, and/or 108. For example, using SDN related interfaces and/or related messages, DRC 102 may configure or provision Diameter routing table 212 using various factors, e.g., current load of a resource or network segment, predicted load of a resource or network segment, resource problems, a new resource becoming available, a resource becoming unavailable, a time of day, subscriber or device issues, or other factors. By providing Diameter routing information 300 and/or provisioning Diameter routing tables, DRC 102 and/or network orchestrator 100 may dynamically adjust current or predicted network conditions and/or may modify SDN boundaries (e.g., by including additional nodes as possible destinations for Diameter messages or by removing nodes as possible destinations for Diameter messages).

Referring to FIG. 3B, Diameter routing information 302 may represent Diameter routing information 300 that is modified after one or more SDN related messages from DRC 102 and/or network orchestrator 100. The routing table of FIG. 3B may include similar or identical fields as the routing table of FIG. 3A. As depicted in FIG. 3B, Diameter routing information 302 may be modified to route Diameter messages to different network nodes than indicated by Diameter routing information 300. For example, Diameter routing information 302 may include an association between a portion of an IMSI (e.g., IMSI portion value: "314024*") and a network node associated with a URI (e.g., URI value: "hss://hss3.vzw.net:1815;transport=udp; protocol=radius"), an FQDN (e.g., FQDN value: "HSS3@VZW.NET"), and an IP address (e.g., IP address value: "192.53.34.41 port number: 1815"). Diameter routing information 302 may also include an association between a portion of an IMSI (e.g., IMSI portion value: "458712353468745") and a network node associated with a URI (e.g., URI value: "hss://hss4.vzw.net:1815;transport=udp;protocol=radius"), an FQDN (e.g., FQDN value: "HSS4@VZW.NET"), and an IP address (e.g., IP address value: "192.53.34.42 port number: 1815").

It will be appreciated that Diameter routing information 300 and 302 may vary depending on the communications network, configuration, messages, and network nodes involved. For example, types of addressing or routing information may vary for network nodes. In another example, Diameter routing information 300 and 302 may include network layer address information for identifying a network node in lieu of a FQDN or URI.

In some embodiments, each association may be between a subscriber ID or a Diameter session or service and address information associated with a particular network node. In such embodiments, multiple entries may be used to identify additional nodes.

In some embodiments, each association may be between a subscriber ID or a Diameter session or service and one or more associated nodes (e.g., backup or secondary node addresses). In such embodiments, additional fields (e.g., backup node fields) may be used to identify additional nodes.

In some embodiments, Diameter routing information 300 or Diameter routing information 302 may include one or more status fields for identifying whether an associated node is currently available, experiencing problems, or inactive.

Figure 4:
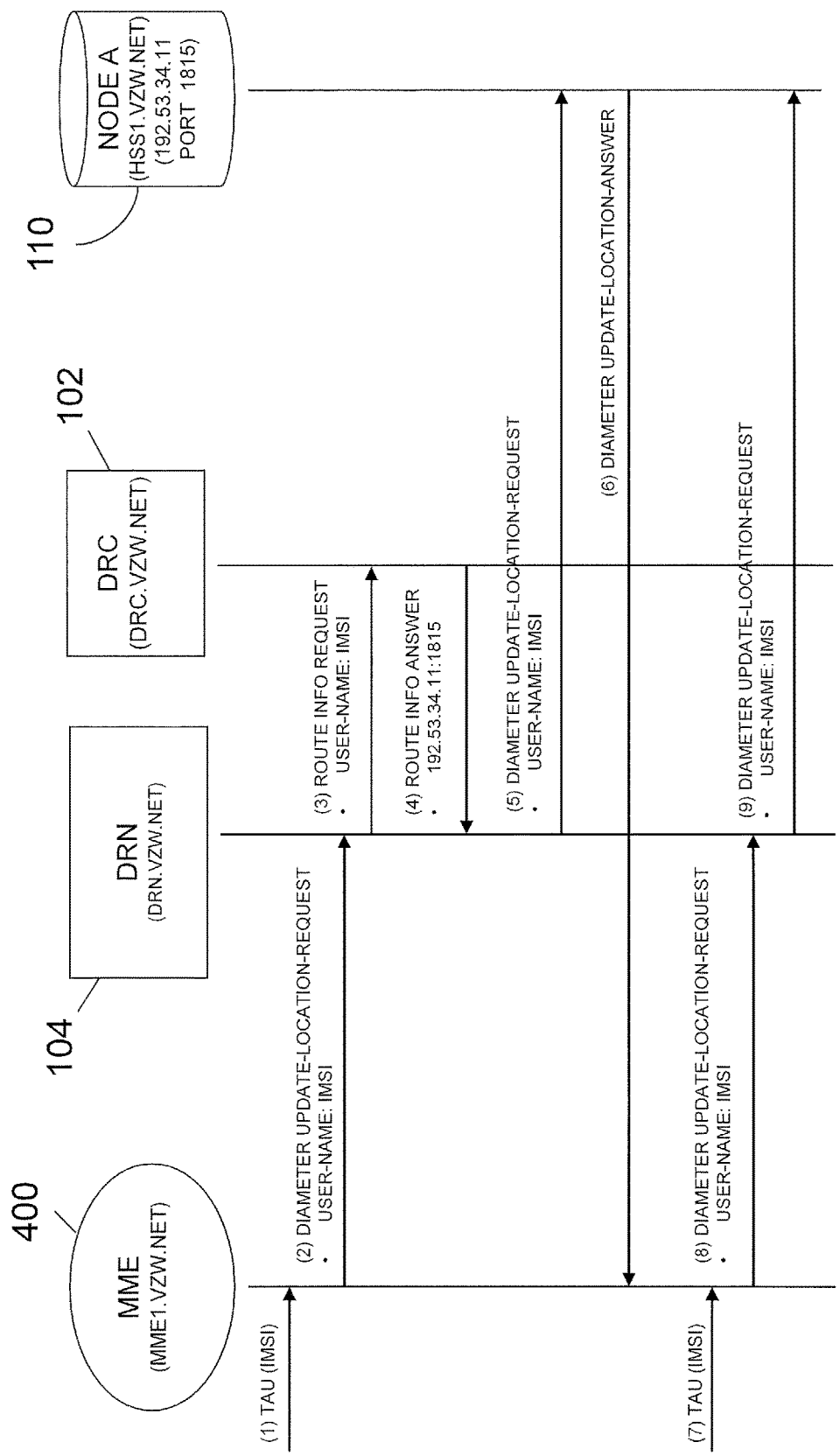
FIG. 4 is a diagram illustrating exemplary messages associated with routing a Diameter message according to an embodiment of the subject matter described herein.

FIG. 4 is a diagram illustrating exemplary messages associated with routing a Diameter message according to an embodiment of the subject matter described herein. In some embodiments, node 110 may be an HSS for maintaining subscriber location information pertaining to a subset of network subscribers. In some embodiments, MME 300 may be an MME for managing mobility events associated with one or more subscribers.

Referring to FIG. 4, at step 1, a mobility management message may be received at a MME 300. In some embodiments, the received mobility management message may be a registration message referred to as a tracking area update (TAU) message. The TAU message or registration message may be initiated by a user device when the user device detects entering a tracking area that is not previously registered in MME 300 for use by the user device. The TAU message may include UE-related information, such as an IMSI or other device identifier.

At step 2, in response to receiving the mobility management message, a Diameter message may be generated and sent from MME 300 to DRN 104. For example, MME 300 may generate and send an Update-Location-Request (ULR) message in response to receiving the TAU message. The ULR message may include various parameters, such as the IMSI value associated with the TAU message.

In some embodiments, MME 300 may not determine or may be unable to provide address information or routing information for sending the Diameter message to an appropriate destination. DRN 104 may be configured to receive and route such messages to appropriate destinations.

In some embodiments, DRN 104 may receive a ULR message sent by MME 300. DRN 104 may examine the received Diameter message and may determine whether and/or how to route the message. For example, network orchestrator 100 may allocate or otherwise nodes 110-116 in a communications network to distribute or reduce processing load on any particular one of nodes 110-116. In this example, if nodes 110-116 do not include identical data, it may be necessary to identify the node that contains a particular subscriber's data when attempting to route messages.

In some embodiments where subscribers or sessions are handled by a plurality of nodes 110-116, DRN 104 may query accessible Diameter routing information (e.g., stored in a local Diameter routing table) for determining an appropriate destination. In some embodiments, querying accessible Diameter routing information may involve using non-application layer information (e.g., an IP data tuple) associated with a Diameter message that is to be routed.

In some embodiments, DRN 104 may be unable to determine addressing or routing information. For example, if an appropriate destination is not found in accessible Diameter routing information, DRN 104 may be capable of requesting Diameter routing information from other nodes, such as DRC 102 or network orchestrator 100 via an SDN related interface.

At step 3, an SDN related message for requesting Diameter routing information may be sent from DRN 104 to DRC 102. For example, DRN 104 may request Diameter routing information from DRC 102 by sending a route information request message via an SDN related interface. The route information request message may include various information associated with the corresponding Diameter message, such as a subscriber identifier and/or session related information.

In some embodiments, DRC 102 may receive a route information request message and may use information stored in the route information request message for determining an appropriate destination. For example, DRC 102 may analyze application layer information, such as Diameter identifiers, stored in the route information request message to determine an appropriate destination.

At step 4, an SDN related message for providing Diameter routing information may be sent from DRC 102 to DRN 104. For example, DRC 102 may provide Diameter routing information to DRN 104 by sending a route information answer message via an SDN related interface. After receiving Diameter routing information from DRC 102, DRN 104 may store the Diameter routing information and may use this information for routing Diameter messages.

In some embodiments, using Diameter routing information provided by DRC 102, DRN 104 may determine an appropriate destination, e.g., node 110, for a Diameter message. After determining an appropriate destination for a received Diameter message, DRN 104 may modify the Diameter message, e.g., to include the destination information, prior to routing the Diameter message.

At step 5, the Diameter message may be sent from DRN 104 to node 110. For example, DRN 104 may send a modified ULR message to node 110.

In some embodiments, node 110 may receive a Diameter message and respond. For example, in response to receiving an ULR message, node 110 may send an Update-Location-Answer (ULA) message indicating that location information was received and stored.

At step 6, a Diameter answer message may be sent from node 110 to MME 300. For example, node 110 may send a ULA message to node 110.

At step 7, a second mobility management message may be received at a MME 300. In some embodiments, the second mobility management message may be a TAU message indicating that a user device is entering a tracking area that is not previously registered in the MME 300 for use by the user device. The TAU message may include UE-related information, such as an IMSI or other device identifier.

At step 8, in response to receiving the mobility management message, a Diameter message may be generated and sent from MME 300 to DRN 104. For example, MME 300 may generate and send an Update-Location-Request (ULR) message in response to receiving the TAU message. The ULR message may include various parameters, such as the IMSI value associated with the TAU message.

DRN 104 may examine the received Diameter message and may determine whether and/or how to route the message. For example, DRN 104 may query accessible Diameter routing information (e.g., stored in a local Diameter routing table) for determining an appropriate destination. In some embodiments, querying accessible Diameter routing information may involve using non-application layer information associated with the Diameter message.

Using accessible Diameter routing information (e.g., previously provided by DRC 102), DRN 104 may determine an appropriate destination, e.g., node 110, for a Diameter message. After determining an appropriate destination for a received Diameter message, DRN 104 may modify the Diameter message, e.g., to include the destination information, prior to routing the Diameter message.

At step 9, the Diameter message may be sent from DRN 104 to node 110. For example, DRN 104 may send a modified ULR message to node 110.

In some embodiments, node 110 may receive a Diameter message and respond. For example, in response to receiving an ULR message, node 110 may send an Update-Location-Answer (ULA) message indicating that location information was received and stored.

It will also be appreciated that the above described messages are for illustrative purposes and that different and/or additional messages may be used.

Figure 5:
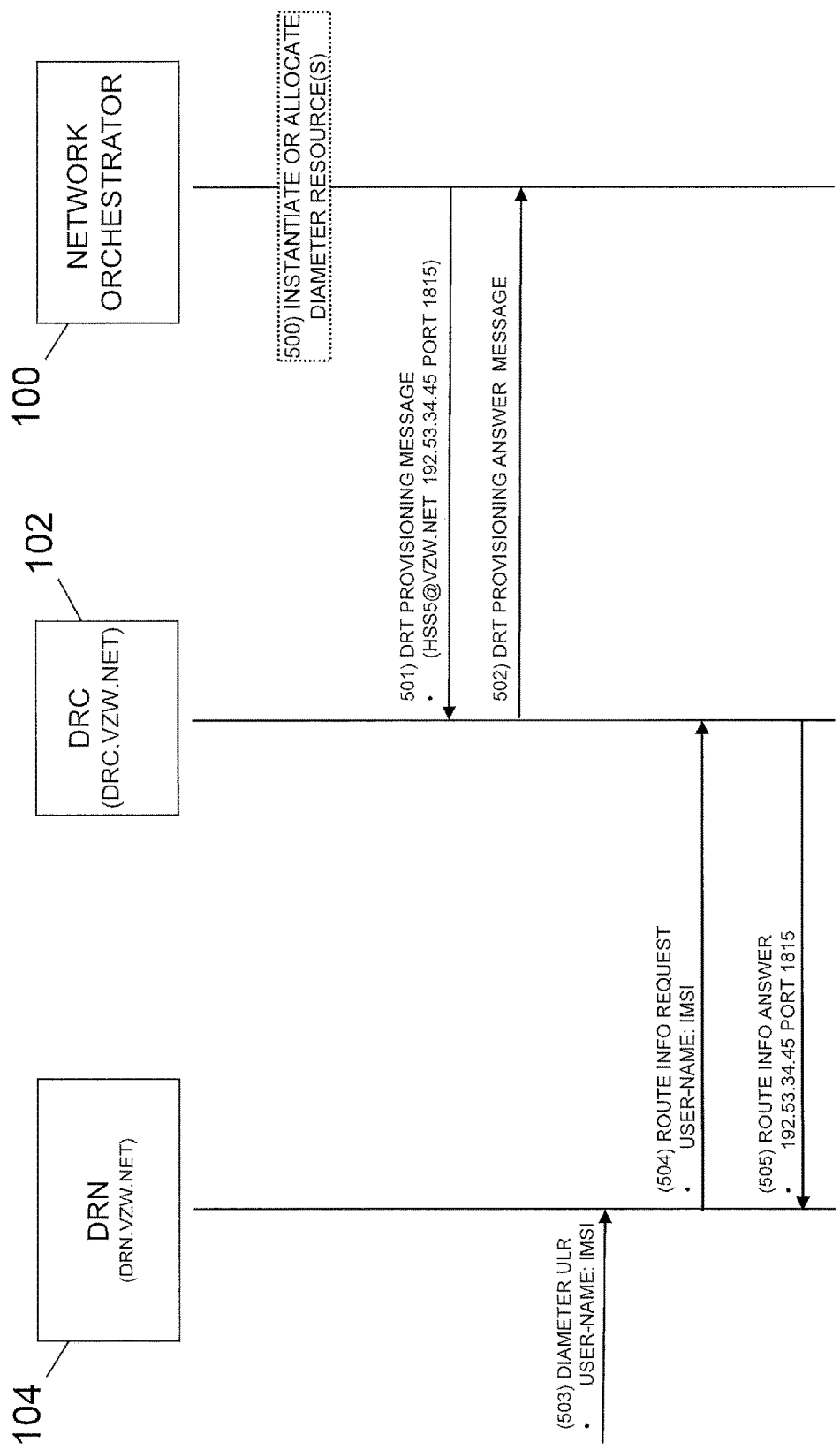
FIG. 5 is a diagram illustrating exemplary messages associated with providing Diameter information about one or more newly available Diameter resources according to an embodiment of the subject matter described herein.

FIG. 5 is a diagram illustrating exemplary messages associated with providing Diameter information about one or more newly available Diameter resources according to an embodiment of the subject matter described herein. In some embodiments, network orchestrator 100 may be configured to instantiate, allocate, or make available one or more Diameter resources (e.g., a Diameter network function or node or additional resources for an existing function or node). For example, network orchestrator 100 may instantiate Diameter resources dynamically (e.g., in response to monitored information, network conditions, or a request from a network node) or statically (e.g., based on preconfigured instructions or directives). In such embodiments, network orchestrator 100 may provide relevant information, such as Diameter routing information, about newly available Diameter resources to DRC 102 or DRN 104 and/or other nodes. By providing the relevant information to DRC 102, Diameter destinations associated with the newly available Diameter resources may be added to a Diameter routing table at DRC 102. DRC 102 may then communicate the Diameter destinations to DRN 104, whereby DRN 104 may use this information to route Diameter messages, readjust load balancing algorithm(s), or readjust failure handling algorithm(s) to the newly available Diameter resources.

Referring to FIG. 5, at step 500, network orchestrator 100 may allocate or instantiate one or more Diameter resources, e.g., for use in a Diameter-based network. For example, network orchestrator 100 may determine that one or more additional Diameter resources (e.g., HSS5@VZW.NET) may be useful for handling an increase in Diameter traffic associated with a particular SDN or portion therein. In this example, network orchestrator 100 may use received information, from other external system, such as another orchestrator or monitoring system, about components in the SDN and/or other relevant information in determining to make available additional Diameter resources.

At step 501, an SDN related message for providing Diameter routing information, or information appropriate for that diameter function, may be sent from network orchestrator 100 to DRC 102. For example, a Diameter routing table (DRT) provisioning message may be sent from network orchestrator 100 to DRC 102. The DRT provisioning message may include Diameter routing information about a newly available Diameter resource, e.g., the Diameter routing information may include a network node FQDN and/or an IP address and port information. In this example, DRC 102 may use the included Diameter routing information to update a Diameter routing table.

At step 502, an SDN related message for acknowledging reception of Diameter routing information may be sent from DRC 102 to network orchestrator 100. For example DRC 102 may send a DRT provisioning answer message indicating that Diameter routing information was successfully received.

At step 503, a Diameter ULR message may be generated and sent to DRN 104. For example, MME 300 may generate and send a ULR message in response to receiving a TAU message. The ULR message may include various parameters, such as the IMSI value associated with the TAU message.

In some embodiments, DRN 104 may be unable to determine addressing or routing information. For example, if an appropriate destination is not found in accessible Diameter routing information, DRN 104 may be capable of requesting Diameter routing information from other nodes, such as DRC 102 or network orchestrator 100 via an SDN related interface.

At step 504, an SDN related message for requesting Diameter routing information may be sent from DRN 104 to DRC 102. For example, DRN 104 may request Diameter routing information from DRC 102 by sending a route information request message via an SDN related interface. The route information request message may include various information associated with the corresponding Diameter message, such as a subscriber identifier and/or session related information.

In some embodiments, DRC 102 may receive a route information request message and may use information stored in the route information request message for determining an appropriate destination. For example, DRC 102 may analyze application layer information, such as Diameter identifiers, stored in the route information request message and may determine that a newly available Diameter resource is an appropriate destination.

At step 505, an SDN related message for providing Diameter routing information may be sent from DRC 102 to DRN 104. For example, DRC 102 may provide Diameter routing information to DRN 104 by sending a route information answer message via an SDN related interface. The route information answer message may include Diameter routing information about a newly available Diameter resource (e.g., HSS5@VZW.NET). After receiving Diameter routing information from DRC 102, DRN 104 may store the Diameter routing information and/or may use this information for routing Diameter messages to the newly available Diameter resource.

In some embodiments, DRN 104 may modify the Diameter message, e.g., to include the Diameter routing information received from DRC 102, prior to routing the Diameter message to the newly available Diameter resource.

It will also be appreciated that the above described messages are for illustrative purposes and that different and/or additional messages may be used. For example, network orchestrator 100 may communicate Diameter routing information to DRN 102 directly (e.g., without using DRC 102). In this example, network orchestrator 100 may send a DRT provisioning message to DRN 104 and DRN 104 may respond with a DRT provisioning answer message to network orchestrator. In another example, DRC 102 may provide Diameter routing information about a newly available Diameter resource to a DRN 102 unilaterally (e.g., automatically or without DRN 104 requesting routing information).

Figure 6:
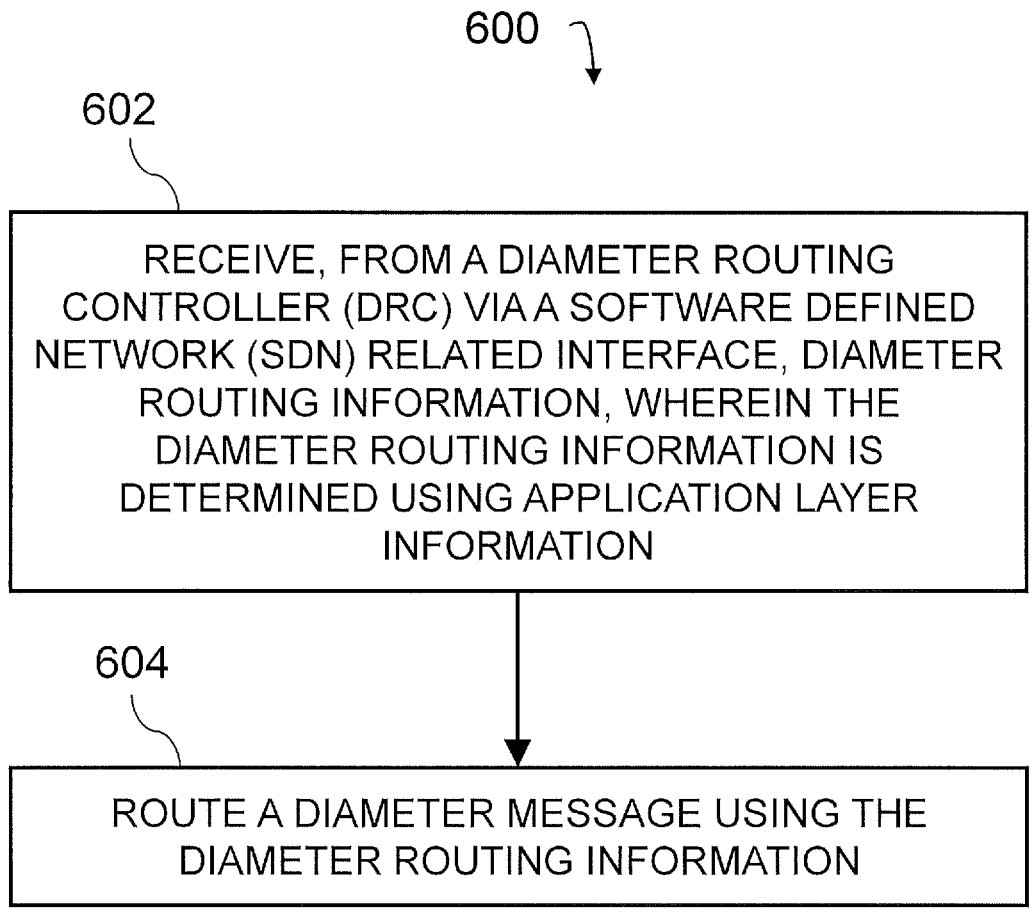
FIG. 6 is a diagram illustrating an exemplary process for routing a Diameter message according to an embodiment of the subject matter described herein.

FIG. 6 is a diagram illustrating an exemplary process 600 for routing a Diameter message according to an embodiment of the subject matter described herein. In some embodiments, exemplary process 600, or portions thereof, may be performed by or at DRN 104, DRN 106, DRN 108, DRC 102, network orchestrator 100, routing module 208, routing module 214, logical Diameter router 204, logical Diameter router 206, PDRA controller 200, OFCS controller 202, and/or another node or module. In some embodiments, exemplary process 600 may include steps 602 and/or 604.

At step 602, Diameter routing information may be received from DRC 102 via an SDN related interface (e.g., SDN interface 210). In some embodiments, the Diameter routing information may be determined using application layer information, e.g., a Diameter realm identifier, a Diameter control code, a Diameter service or application identifier, and/or a Diameter node URI or FQDN.

In some embodiments, Diameter routing information may include switching information (e.g., layer 2 and/or layer 3 information). In such embodiments, routing a Diameter message using Diameter routing information may include switching the Diameter message using the switching information In some embodiments, Diameter routing information may be received in response to the DRN 104 querying DRC 102 for the Diameter routing information after receiving a Diameter request message for initiating a Diameter session or an initial Diameter message.

In some embodiments, DRN 104 may use previously obtained Diameter routing information for routing Diameter message. For example, after receiving Diameter routing information for a particular session from DRC 102, DRN 104 may receive a second Diameter message associated with the Diameter session and may route the second Diameter message using the Diameter routing information associated with that particular session.

In some embodiments, Diameter router information may be received in response to network orchestrator 100 or DRC 102 determining that DRN 104 should receive the Diameter routing information based on a current condition or a predicted future condition.

In some embodiments, an SDN related interface may include an OpenFlow protocol interface, a network virtualization using generic routing encapsulation (NVGRE) protocol interface, a virtual extensible LAN (VXLAN) protocol interface, a forwarding and control element separation (ForCES) protocol interface, a locator/ID separation protocol (LISP) interface, an open vSwitch database management (OVSDB) protocol interface, a border gateway protocol (BGP) interface, a BGP link-state (BGP-LS) protocol interface, a path computation element protocol (PCEP) interface, a network configuration (NETCONF) protocol interface, a simple network management protocol (SNMP) interface, or a Diameter protocol interface. For example, SDN related interface may be used for communicating between DRC 102 and DRN 104.

In some embodiments, DRC 102 may include a PCRF, an OFCS, and/or network orchestrator 100. For example, DRC 102 may be capable of determining routing decisions based on policy information, subscriber credit information, and/or various network conditions.

In some embodiments, DRC 102 may be configured to communicate with network orchestrator 100. In such embodiments, network orchestrator 100 may be configured to monitor or predict network conditions and may allocate or reallocate various network resources based on the monitored or the predicted network conditions.

In some embodiments, Diameter routing information may include address information associated with a destination node or a second Diameter routing node, layer 2 information, layer 3 information, layer 4 information, layer 5 information, layer 6 information, layer 7 information, switching information, an IP address, port information, Diameter application layer information, a Diameter realm ID, a Diameter command code, a Diameter node name, a URI, and/or an FQDN.

At step 602, a Diameter message may be routed using the Diameter routing information. For example, DRN 104 may route a Diameter message to node 110 using address information determined and provided by DRC 102.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing a Diameter message, the method comprising:
at a Diameter routing node:
receiving a first Diameter message associated with a Diameter session;
determining an Internet protocol (IP) data tuple associated with the Diameter session using data from an IP packet carrying the first Diameter message, wherein the IP data tuple includes a source IP address, a source port, a destination IP address, a destination port, and a transport protocol;
after receiving the first Diameter message, determining that the Diameter routing node does not have Diameter routing information associated with the Diameter session indicated in the first Diameter message by querying, using the IP data tuple associated with the Diameter session, a memory containing associations between Diameter routing information associated with a plurality of Diameter sessions and corresponding IP data tuples associated with the plurality of Diameter sessions and not finding the Diameter routing information associated with the Diameter session in the memory;
sending, to a Diameter routing controller (DRC) via a software defined network (SDN) related interface, a query for requesting the Diameter routing information associated with the Diameter session, wherein the query includes Diameter application layer information from the first Diameter message, wherein the Diameter routing controller makes routing decisions for the first Diameter message using the Diameter application layer information in the first Diameter message in lieu of the Diameter routing node making the routing decisions;
receiving, from the DRC via the SDN related interface, Diameter routing information associated with the Diameter session, wherein the Diameter routing information associated with the Diameter session is determined using the Diameter application layer information;
storing, in the memory, an association between the Diameter routing information associated with the Diameter session and the IP data tuple associated with the Diameter session;
routing the first Diameter message using the Diameter routing information associated with the Diameter session received from the DRC, wherein the routing is performed without the Diameter routing node analyzing the Diameter application layer information in the first Diameter message, wherein the Diameter routing information associated with the Diameter session includes a second destination IP address and a second destination port;
receiving a second Diameter message associated with the Diameter session, wherein the second Diameter message is associated with the IP data tuple associated with the Diameter session;
determining, by querying the memory using the IP data tuple, that the Diameter routing information associated with the Diameter session and stored in the memory is usable for routing the second Diameter message; and
routing the second Diameter message using the second destination IP address and the second destination port of the Diameter routing information associated with the Diameter session.

2. The method of claim 1 wherein the Diameter routing information includes switching information and wherein routing the Diameter message using the Diameter routing information includes switching the Diameter message using the switching information.

3. The method of claim 1 wherein additional Diameter router information is received in response to a network orchestrator or the DRC determining that the Diameter routing node should receive the additional Diameter routing information based on a current condition or a predicted future condition.

4. The method of claim 1 wherein the SDN related interface includes an OpenFlow protocol interface, a network virtualization using generic routing encapsulation (NVGRE) protocol interface, a virtual extensible LAN (VXLAN) protocol interface, a forwarding and control element separation (ForCES) protocol interface, a locator/ID separation protocol (LISP) interface, an open vSwitch database management (OVSDB) protocol interface, a border gateway protocol (BGP) interface, a BGP link-state (BGP-LS) protocol interface, a path computation element protocol (PCEP) interface, a network configuration (NETCONF) protocol interface, a simple network management protocol (SNMP) interface, or a Diameter protocol interface.

5. The method of claim 1 wherein the DRC includes a policy and charging rules function (PCRF), an offline charging system (OFCS), or a network orchestrator.

6. The method of claim 1 wherein the DRC is configured to communicate with a network orchestrator, wherein the network orchestrator is configured to monitor or predict network conditions and allocate or reallocate various network resources based on the monitored or the predicted network conditions.

7. The method of claim 1 wherein the Diameter routing information includes address information associated with a destination node or a second Diameter routing node, layer 2 information, layer 3 information, layer 4 information, layer 5 information, layer 6 information, layer 7 information, switching information, an IP address, port information, a uniform resource identifier (URI), Diameter application layer information, a Diameter realm identifier (ID), a Diameter command code, a Diameter node name, or a fully qualified domain name (FQDN).

8. A system for routing a Diameter message, the system comprising:
a Diameter routing node comprising:
at least one processor; and
a software defined network (SDN) related interface, wherein the Diameter routing node is configured to receive a first Diameter message associated with a Diameter session, to determine an IP data tuple associated with the Diameter session using data from an Internet protocol (IP) packet carrying the first Diameter message, wherein the IP data tuple includes a source IP address, a source port, a destination IP address, a destination port, and a transport protocol; after receiving the first Diameter message, to determine that the Diameter routing node does not have Diameter routing information associated with the Diameter session indicated in the first Diameter message by querying, using the IP data tuple associated with the Diameter session, a memory containing associations between Diameter routing information associated with a plurality of Diameter sessions and corresponding IP data tuples associated with the plurality of Diameter sessions and not finding the Diameter routing information associated with the Diameter session in the memory; to send, to a Diameter routing controller (DRC) via the SDN related interface, a query for requesting the Diameter routing information, wherein the query includes Diameter application layer information from the first Diameter message, wherein the Diameter routing controller makes routing decisions for the first Diameter message using the Diameter application layer information in the first Diameter message in lieu of the Diameter routing node making the routing decisions, to receive, from the DRC via the SDN related interface, the Diameter routing information for the first Diameter message, wherein the Diameter routing information for the first Diameter message is determined using the Diameter application layer information, wherein the Diameter routing information associated with the Diameter session includes a second destination IP address and a second destination port, to store, in the memory, an association between the Diameter routing information for the first Diameter message and the IP data tuple associated with the Diameter session, to route the first Diameter message using the Diameter routing information associated with the Diameter session received from the DRC, wherein the routing is performed without the Diameter routing node analyzing the Diameter application layer information in the first Diameter message, to receive a second Diameter message associated with the Diameter session, wherein the second Diameter message is associated with the IP data tuple associated with the Diameter session, to determine, by querying the memory using the IP data tuple, that the Diameter routing information associated with the Diameter session and stored in the memory is usable for routing the second Diameter message, and to route the second Diameter message using the second destination IP address and the second destination port of the Diameter routing information associated with the Diameter session.

9. The system of claim 8 wherein the Diameter routing information includes switching information and wherein routing the Diameter message using the Diameter routing information includes switching the Diameter message using the switching information.

10. The system of claim 8 wherein a network orchestrator or the DRC is configured to determine that the Diameter routing node should receive additional Diameter routing information based on a current condition or a predicted future condition.

11. The system of claim 8 wherein the SDN related interface includes an OpenFlow protocol interface, a network virtualization using generic routing encapsulation (NVGRE) protocol interface, a virtual extensible LAN (VXLAN) protocol interface, a forwarding and control element separation (ForCES) protocol interface, a locator/ID separation protocol (LISP) interface, an open vSwitch database management (OVSDB) protocol interface, a border gateway protocol (BGP) interface, a BGP link-state (BGP-LS) protocol interface, a path computation element protocol (PCEP) interface, a network configuration (NETCONF) protocol interface, a simple network management protocol (SNMP) interface, or a Diameter protocol interface.

12. The system of claim 8 wherein the DRC includes a policy and charging rules function (PCRF), an offline charging system (OFCS), or a network orchestrator.

13. The system of claim 8 wherein the DRC is configured to communicate with a network orchestrator, wherein the network orchestrator is configured to monitor or predict network conditions and allocate or reallocate various network resources based on the monitored or the predicted network conditions.

14. The system of claim 8 wherein the Diameter routing information includes address information associated with a destination node or a second Diameter routing node, layer 2 information, layer 3 information, layer 4 information, layer 5 information, layer 6 information, layer 7 information, switching information, an IP address, port information, a uniform resource identifier (URI), Diameter application layer information, a Diameter realm identifier (ID), a Diameter command code, a Diameter node name, or a fully qualified domain name (FQDN).

15. A non-transitory computer readable medium comprising computer executable instructions embodied in the non-transitory computer readable medium that when executed by a processor of a Diameter routing node control the Diameter routing node to perform steps comprising:
    receiving a first Diameter message associated with a Diameter session;
        determining an Internet protocol (IP) data tuple associated with the Diameter session using data from an IP packet carrying the first Diameter message, wherein the IP data tuple includes a source IP address, a source port, a destination IP address, a destination port, and a transport protocol;
    after receiving the first Diameter message, determining that the Diameter routing node does not have Diameter routing information associated with the Diameter session indicated in the first Diameter message by querying, using the IP data tuple associated with the Diameter session, a memory containing associations between Diameter routing information associated with a plurality of Diameter sessions and corresponding IP data tuples associated with the plurality of Diameter sessions and not finding the Diameter routing information associated with the Diameter session in the memory;
    sending, to a Diameter routing controller (DRC) via a software defined network (SDN) related interface, a query for requesting the Diameter routing information associated with the Diameter session, wherein the query includes Diameter application layer information from the first Diameter message, wherein the Diameter routing controller makes routing decisions for the first Diameter message using the Diameter application layer information in the first Diameter message in lieu of the Diameter routing node making the routing decisions;
    receiving, from the DRC via the SDN related interface, Diameter routing information associated with the Diameter session, wherein the Diameter routing information associated with the Diameter session is determined using the Diameter application layer information;
    storing, in the memory, an association between the Diameter routing information associated with the Diameter session and the IP data tuple associated with the Diameter session;
    routing the first Diameter message using the Diameter routing information associated with the Diameter session received from the DRC, wherein the routing is performed without the Diameter routing node analyzing the Diameter application layer information in the first Diameter message;
    receiving a second Diameter message associated with the Diameter session, wherein the second Diameter message is associated with the IP data tuple associated with the Diameter session, wherein the Diameter routing information associated with the Diameter session includes a second destination IP address and a second destination port;
    determining, by querying the memory using the IP data tuple, that the Diameter routing information associated with the Diameter session and stored in the memory is usable for routing the second Diameter message; and
    routing the second Diameter message using the second destination IP address and the second destination port of the Diameter routing information associated with the Diameter session.

* * * * *

UNITED STATES PATENT AND TRADEMARK OFFICE
CERTIFICATE OF CORRECTION

PATENT NO.        : 11,388,082 B2
APPLICATION NO.   : 14/092898
DATED             : July 12, 2022
INVENTOR(S)       : McMurry et al.

It is certified that error appears in the above-identified patent and that said Letters Patent is hereby corrected as shown below:

On the Title Page

On page 2, Column 1, under U.S. Patent Documents, Line 24, delete "2002/0009181" and insert
-- 2002/0091810 --, therefor.

On page 2, Column 2, under U.S. Patent Documents, Line 27, delete "2013/0017381" and insert
-- 2013/0173810 --, therefor.

On page 3, Column 1, under Foreign Patent Documents, Line 68, below "WO 2015/017422 Al" insert
-- WO WO 2015/041750 A1 3/2015 --, therefor.

On page 3, Column 2, under Other Publications, Lines 56-57, delete "Mediator" and insert -- Media
for --, therefor.

On page 4, Column 2, under Other Publications, Line 18, delete ""OpenFlowz" and insert
-- "OpenFlow --, therefor.

On page 4, Column 2, under Other Publications, Line 42, delete "Telecummunications" and insert
-- Telecommunications --, therefor.

On page 5, Column 2, under Other Publications, Line 20, delete "regaridng" and insert -- regarding --,
therefor.

On page 5, Column 2, under Other Publications, Line 29, delete "Communiction" and insert
-- Communication --, therefor.

On page 5, Column 2, under Other Publications, Line 65, delete "Applicaton" and insert
-- Application --, therefor.

Signed and Sealed this
Sixteenth Day of July, 2024

Katherine Kelly Vidal
*Director of the United States Patent and Trademark Office*

In the Specification

In Column 4, Line 1, delete "(eg., (e.g.," and insert -- (e.g., --, therefor.

In Column 13, Lines 20-21, delete "information" and insert -- information. --, therefor.